(12) United States Patent
Ono

(10) Patent No.: US 8,811,739 B2
(45) Date of Patent: Aug. 19, 2014

(54) IMAGE PROCESSING DEVICE

(75) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 13/585,644

(22) Filed: Aug. 14, 2012

(65) Prior Publication Data

US 2013/0044949 A1 Feb. 21, 2013

(30) Foreign Application Priority Data

| Aug. 17, 2011 | (JP) | 2011-178274 |
| Oct. 3, 2011 | (JP) | 2011-218983 |
| Oct. 3, 2011 | (JP) | 2011-218984 |
| Oct. 3, 2011 | (JP) | 2011-218985 |

(51) Int. Cl.
*G06K 9/00* (2006.01)
*H04N 1/40* (2006.01)

(52) U.S. Cl.
CPC .............................. *H04N 1/40012* (2013.01)
USPC ....................................................... 382/167

(58) Field of Classification Search
None
See application file for complete search history.

(56) References Cited

U.S. PATENT DOCUMENTS

| 4,688,031 A * | 8/1987 | Haggerty | 345/600 |
| 4,703,318 A * | 10/1987 | Haggerty | 345/634 |
| 5,153,576 A * | 10/1992 | Harrington | 345/596 |
| 5,701,401 A * | 12/1997 | Harrington et al. | 358/1.9 |
| 5,726,781 A * | 3/1998 | Isemura et al. | 358/530 |
| 5,898,819 A * | 4/1999 | Austin et al. | 358/1.9 |
| 7,009,739 B1 * | 3/2006 | Lin et al. | 358/500 |
| 7,777,917 B2 * | 8/2010 | Noel | 358/3.26 |
| 8,115,977 B2 * | 2/2012 | Noel | 358/518 |
| 8,179,565 B2 * | 5/2012 | Noel | 358/1.9 |
| 8,253,949 B2 * | 8/2012 | Noel | 358/1.1 |
| 2005/0280874 A1 * | 12/2005 | Noel | 358/3.13 |
| 2007/0253040 A1 * | 11/2007 | Lee et al. | 358/518 |
| 2011/0090237 A1 | 4/2011 | Shimamura et al. | |
| 2011/0141501 A1 | 6/2011 | Shirata | |

FOREIGN PATENT DOCUMENTS

| EP | 0 199 272 A2 | 10/1986 |
| JP | 2011-023895 A | 2/2011 |
| WO | 2011/082798 A1 | 7/2011 |

OTHER PUBLICATIONS

European Search Report dated Dec. 12, 2013 in application No. 12180393.6.

* cited by examiner

*Primary Examiner* — Bhavesh Mehta
*Assistant Examiner* — Feng Niu
(74) *Attorney, Agent, or Firm* — Maschoff Brennan

(57) ABSTRACT

An image processing device includes a pattern kind determining unit that determines a hatch pattern representing a hatch shape corresponding to a color of a color image by a monochromatic concentration, a pattern concentration determining unit that determines a background concentration that is applied to a hatch-shaped background area, and a monochromatic image data generating unit that generates monochromatic image data in which the hatch pattern having the background concentration is applied to the background area. The pattern concentration determining unit changes the background concentration of the hatch pattern according to the color of the color image.

18 Claims, 29 Drawing Sheets

| COLOR VALUE | | | PATTERN KIND | BACKGROUND CONCENTRATION | FOREGROUND CONCENTRATION |
| --- | --- | --- | --- | --- | --- |
| R | G | B | | | |
| 255 | 0 | 0 | GRID LINE | 84 | 26 |
| 254 | 0 | 0 | GRID LINE | 83 | 25 |
| ⋮ | ⋮ | ⋮ | ⋮ | ⋮ | ⋮ |
| 0 | 0 | 239 | OBLIQUE GRID LINE | 19 | 51 |
| ⋮ | ⋮ | ⋮ | ⋮ | ⋮ | ⋮ |
| 0 | 0 | 0 | NONE | 0 | 0 |

FIG. 14

| R | G | B | PATTERN KIND | FOREGROUND CONCENTRATION | BACKGROUND CONCENTRATION | BOUNDARY CONCENTRATION |
|---|---|---|---|---|---|---|
| 255 | 0 | 0 | GRID | 121 | 182 | 100 |
| 254 | 0 | 0 | GRID | 121 | 182 | 100 |
| ⋮ | | | | | | |
| 239 | 0 | 0 | GRID | 222 | 177 | 168 |
| ⋮ | | | | | | |
| 0 | 0 | 239 | HORIZONTAL | 245 | 221 | 168 |
| ⋮ | | | | | | |
| 0 | 0 | 0 | NONE | 255 | 255 | 255 |

FIG. 20

| R | G | B | PATTERN KIND | FOREGROUND CONCENTRATION | BACKGROUND CONCENTRATION |
|---|---|---|---|---|---|
| 255 | 0 | 0 | GRID | 128 | 186 |
| 254 | 0 | 0 | GRID | 128 | 186 |
| ⋮ | | | | | |
| 239 | 0 | 0 | GRID | 232 | 177 |
| ⋮ | | | | | |
| 0 | 0 | 239 | HORIZONTAL | 253 | 221 |
| ⋮ | | | | | |
| 0 | 0 | 0 | NONE | 255 | 255 |

FIG. 28

| R | G | B | PATTERN KIND | FOREGROUND CONCENTRATION | BACKGROUND CONCENTRATION |
|---|---|---|---|---|---|
| 255 | 0 | 0 | GRID | 128 | 186 |
| 254 | 0 | 0 | GRID | 128 | 186 |
| ⋮ | | | | | |
| 239 | 0 | 0 | GRID | 232 | 177 |
| ⋮ | | | | | |
| 0 | 0 | 239 | HORIZONTAL | 253 | 221 |
| ⋮ | | | | | |
| 0 | 0 | 0 | NONE | 255 | 255 |

IMAGE PROCESSING DEVICE

BACKGROUND

1. Technical Field

The present invention relates to an image processing device that converts color image data into monochromatic image data.

2. Related Art

Hitherto, to convert color image data into monochromatic image data, a method of calculating gray values from RGB values of the color image data according to the following formula (1) to obtain monochromatic image data represented by gray values is widely used. Brightness information of an original color image is reflected in the gray values. According to the method, it is possible to obtain image data of a monochromatic image to which the brightness of the original color image is reflected. In addition, "R", "G", and "B" of formula (1) are a red gradation value, a green gradation value, and a blue gradation value of the color image data, and "Gray" is the gray value, that is, a concentration of monochromatic black.

$$Gray = 0.3R + 0.59G + 0.11B \quad (1)$$

When the color image data is converted into the monochromatic image data by the gray conversion according to formula (1), a plurality of RGB values, for example, (R, G, B)=(255, 0, 0), (0, 128, 0) are converted into equivalent gray values. As described above, two colors having difference in the color image before the conversion are represented by the same gray value in the monochromatic image, and the color of the original color image before the conversion may not be differentiated from the monochromatic image after the conversion.

In JP-A-2011-23895, a method is provided in which a color image is converted into color images of cyan, magenta, and yellow, a dither matrix of generating patterns different in the color images is applied to generate dot patterns of the colors, and the dot patterns of the color are synthesized, thereby obtaining monochromatic image data. According to the method disclosed in JP-A-2011-23895, it is possible to obtain a monochromatic image formed by superimposing the different patterns of the colors of cyan, magenta, and yellow. Accordingly, for example, in the case of the conversion into (R, G, B)=(255, 0, 0), (0, 128, 0), and the like, the colors with the equivalent values are reflected to the monochromatic image, where the difference in color in the original color image becomes shapes of different patterns. Accordingly, when the color image before the conversion is subjected to gray conversion and even when undistinguishable colors are used, it is possible to convert the image data into image data of the monochromatic image with distinguishable color difference in the original color image.

However, according to the method disclosed in JP-A-2011-23895, the image of the monochromatic image data is formed by superimposing the dot pattern each color of cyan, magenta, and yellow, and thus is more detailed than each of these dot patterns, and furthermore a great number of kinds of patterns appear in the monochromatic image. For this reason, in the monochromatic image generated by the method disclosed in JP-A-2011-23895, it is difficult for the user to differentiate the pattern shapes, and it is difficult to recognize the differences in color in the original color image.

SUMMARY

The invention may be realized by the following aspects or application examples.

Application Example 1

According to Application Example 1, there is provided an image processing device which converts color image data representing a color image into monochromatic image data, the image processing device including a pattern determining unit that determines a monochromatic pattern representing a shape corresponding to a color of the color image by a monochromatic concentration; a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image.

With such a configuration, in addition to the shape of the monochromatic pattern, the color of the color image is reflected as the change of the background concentration in the area that forms the background of the pattern. Accordingly, it is possible to obtain the image data of the monochromatic image so that when a user observes the image, the color differences in the original color image are easily distinguishable from the shape of the monochromatic pattern and the concentration change of the background.

Application Example 2

In the image processing device according to Application Example 1, the pattern concentration determining unit may change the background concentration according to brightness of the color image.

With such a configuration, the background concentration of the monochromatic image data is changed according to the brightness of the color image. Accordingly, when the user observes the image, it is possible to obtain the image data of the monochromatic image in which the differential brightness colors in the original color image are distinguishable.

Application Example 3

In the image processing device according to Application Example 2, the pattern concentration determining unit may determine the background concentration such that brightness of the monochromatic image is equal to the brightness of the color image.

With such a configuration, the brightness of the color image is preserved in the monochromatic image, and thus it is possible to obtain the monochromatic image data with excellent reproducibility of the brightness.

Application Example 4

In the image processing device according to Application Example 2, the pattern concentration determining unit may determine the background concentration of the monochromatic pattern such that average brightness of the image area to which the monochromatic pattern is applied in the color image is equal to the average brightness of the monochromatic pattern.

With such a configuration, the brightness of the color image is preserved in the monochromatic image for each image area to which the monochromatic pattern is applied, and thus it is possible to obtain the monochromatic image data with excellent reproducibility of the brightness.

Application Example 5

In the image processing device according to Application Example 1, the pattern determining unit may determine the monochromatic pattern representing a shape corresponding to the color of the color image of the color image data by the monochromatic concentration.

With such a configuration, it is possible to reflect the color of the color image to the monochromatic image data.

Application Example 6

In the image processing device according to Application Example 1, the monochromatic pattern may be a hatch pattern representing a shape by monochromatic lines, and the pattern determining unit may determine the hatch pattern as the pattern applied to the color image where the hatch pattern has higher line density as the brightness of the color of the color image becomes lower.

With such a configuration, the line density of the hatching becomes higher as the brightness of the color image becomes lower. Accordingly, it is possible to obtain the image data of the monochromatic image capable of giving the user who observes the monochromatic image the impression closer to the color image.

Application Example 7

In the image processing device according to Application Example 1, the pattern concentration determining unit may make, among a first color and a second color adjacent to each other in a plurality of color areas formed by partitioning a color circle, the concentration of the shape of the monochromatic pattern corresponding to the first color higher than the background concentration, and makes the concentration of the shape of the monochromatic pattern corresponding to the second color lower than the background concentration.

With such a configuration, in the first color and the second color of the color image adjacent to each other in the plurality of color areas formed by partitioning the color circle, the shape of the monochromatic image is represented in one color by a concentration higher than the background concentration, and in the other color by a concentration lower than the background concentration. Accordingly, even in the first color and the second color which is included in the color areas adjacent to each other in the plurality of color areas formed by partitioning the color circle of the original color image, and is not easily distinguishable with respect to the color image, it is possible to obtain the image data of the monochromatic image in which the color difference is more easily distinguishable.

Application Example 8

In the image processing device according to Application Example 1, in the pattern determining unit, the monochromatic pattern corresponding to a fourth color in a complementary relationship with a third color may represent a shape formed by rotating the shape of the monochromatic pattern corresponding to the third color.

With such a configuration, the shape of the monochromatic pattern corresponding to the fourth color complementary with the third color is formed by rotating the shape of the monochromatic pattern corresponding to the third color. Accordingly, it is possible to recognize that the third color and the fourth color in the original color image are complementary from the monochromatic image.

Application Example 9

In the image processing device according to Application Example 1, the pattern determining unit may change a shape of the monochromatic pattern according to chroma of the color image.

With such a configuration, the shape of the monochromatic pattern represented in the monochromatic image is changed according to the chroma of the color image, and thus it is possible to obtain the image data of the monochromatic image in which the difference in chroma in the original color image is distinguishable.

Application Example 10

The image processing device according to Application Example 1 may further include an image kind determining unit that determines a kind of the color image, and the monochromatic image data generating unit may convert the color image into a monochromatic image represented by a monochromatic concentration according to the determination result of the image kind determining unit.

With such a configuration, even when object images with the same color are overlapped with each other, the object images in which kinds of attributes of the object images are different are not buried in each other, and it is possible to obtain the image data of the monochromatic image in which the original color image is easily distinguishable.

Application Example 11

The image processing device according to Application Example 1 may further include a prohibiting image determining unit that determines whether or not the color image includes a predetermined prohibiting image so as not to apply the monochromatic pattern, and the monochromatic image data generating unit may convert the color image into a monochromatic image represented by a monochromatic concentration without applying the monochromatic pattern to the prohibiting image included in the color image.

With such a configuration, the image data of the monochromatic image to which the shape of the monochromatic pattern is not added to the predetermined image is generated. Accordingly, as for the image in which inconvenience occurs when the shape is added to, for example, a logo of a corporation which has to be faithfully represented, it is possible to obtain the monochromatic image data faithfully representing the original color image without adding the shape.

Application Example 12

The image processing device according to Application Example 1 may further include correspondence information in which the color of the color image is associated in advance with the background concentration, and the pattern concentration determining unit may determine the background concentration corresponding to the color of the color image with reference to the correspondence information.

With such a configuration, the background concentration of the monochromatic pattern is determined according to the correspondence information, and thus it is possible to obtain the monochromatic image data representing the color difference in the original color image from the color image data by a simple and easy process.

Application Example 13

In the image processing device according to Application Example 1, the pattern concentration determining unit makes, a concentration of a boundary area that is a boundary between a background area of a monochromatic image and a pattern area as a foreground superposed on the background area in which a difference in concentration from the background area is larger than a predetermined value, lower than any concentration between the concentrations of the background area and the pattern area.

With such a configuration, the concentration of the boundary area that is the boundary between the background area of the monochromatic image and the pattern area as the foreground in which the difference in concentration from the background area is larger than the predetermined value is made lower than any concentration between the concentrations of the background area and the pattern area. Accordingly, the image is viewed as a monochromatic image with high contrast by a contrast effect of colors. When such a monochromatic image is printed, the boundary area is printed brighter than the pattern area and the background area. Therefore, it is possible to suppress using of toner or the like, and thus it is possible to reduce a printing cost.

Application Example 14

In the image processing device according to Application Example 13, the pattern concentration determining unit may make a higher concentration between the concentration of the background area and the concentration of the pattern area lower.

With such a configuration, it is possible to lower a higher concentration of the concentration of the background area and the concentration of the pattern area while securing a desired contrast, and thus it is possible to further suppress the using of the toner for printing.

Application Example 15

In the image processing device according to Application Example 13, the pattern concentration determining unit may refer to a table in which at least one of the concentration of the background area, the concentration of the pattern area, and the concentration of the boundary area is regulated.

With such a configuration, it is possible to rapidly acquire each concentration.

Application Example 16

The image processing device according to Application Example 1 may further include a text vicinity determining unit that applies a first hatch pattern having a shape corresponding to a color of a graphic image including a text image to an image area excluding a first area within a predetermined distance from the text image, according to the color of the graphic image.

With such a configuration, the first hatch pattern is applied to the image area excluding the first area within the predetermined distance from the text image, corresponding to the color of the graphic image. Accordingly, the first area is formed between the text image and the first hatch pattern, visibility of the text image is improved, and thus it is possible to avoid misrecognition of the text.

Application Example 17

In the image processing device according to Application Example 16, the text vicinity determining unit may not apply any hatch pattern to the first area.

With such a configuration, the visibility of the text image is further improved.

Application Example 18

The image processing device according to Application Example 1 may further include a concentration changing unit that applies a hatch pattern having a shape corresponding to a color of a graphic image including a text image to an image area corresponding to the color of the graphic image, and changes at least one of the concentrations of a first area of the hatch pattern far away from the text image at a predetermined distance and the text image, to make a concentration difference between the first area and the text image large.

With such a configuration, the concentration of at least one of the first area of the hatch pattern far away from the text image at the predetermined distance and the text image is changed, the concentration difference between the first area and the text image makes large to improve the visibility of the text image, and thus it is possible to avoid the misrecognition of the text.

Application Example 19

In the image processing device according to Application Example 18, the concentration changing unit may change the concentration of the first area such that the concentration difference becomes larger as the distance between the hatch pattern and the text image becomes smaller in the first area.

With such a configuration, the visibility of the text image is further improved.

Application Example 20

According to Application Example 20, there is provided an image processing method of converting color image data representing a color image into monochromatic image data, the image processing method including: determining a monochromatic pattern representing a shape corresponding to a color of the color image by a monochromatic concentration; determining a background concentration of an area of a background of the shape in an image area of the monochromatic pattern; and generating the monochromatic image data of the monochromatic image to which the monochromatic pattern having the background concentration is applied in the image area corresponding to the color image, wherein the background concentration is changed according to the color of the color image.

With such a configuration, the color of the color image is reflected as the change of the background concentration, to the monochromatic image, in addition to the shape of the monochromatic pattern. Accordingly, when the user observes the image, it is possible to obtain the image data of the monochromatic image, in which the color difference in the original color image is easily distinguishable.

BRIEF DESCRIPTION OF THE DRAWINGS

The invention will be described with reference to the accompanying drawings, wherein like numbers reference like elements.

FIG. 14 is a diagram illustrating an example of a pattern selection table.

FIG. 20 is a diagram illustrating an example of a pattern selection table.

FIG. 28 is a diagram illustrating an example of a pattern selection table.

DESCRIPTION OF EXEMPLARY EMBODIMENTS

First Embodiment

Hereinafter, a first embodiment of the invention will be described with reference to the drawings. In the first embodiment, a printing system including a host computer as an example of an image processing device will be described.

Figure 1:
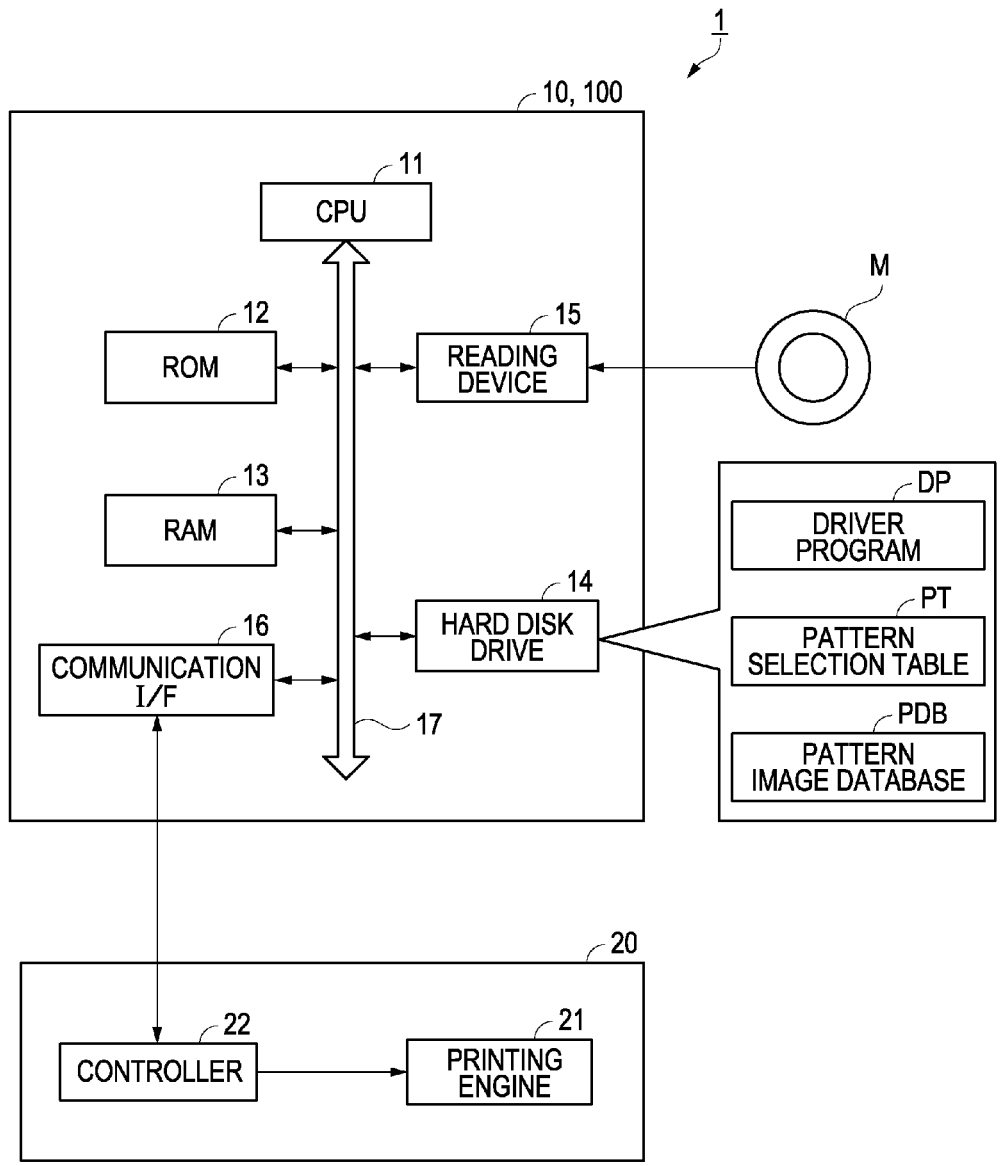
FIG. 1 is a diagram illustrating a schematic configuration of a printing system according to a first embodiment.

FIG. 1 is a diagram illustrating a schematic configuration of the printing system 1 according to the first embodiment. As shown in FIG. 1, the printing system 1 includes a host computer 10 and a printer 20, and the host computer 10 and the printer 20 are connected to be communicable for data with each other.

The printer 20 includes a printing engine 21 that performs printing on a medium such as a sheet, and a controller 22 that controls an operation or the like of the printing engine 21. The printer 20 performs a process of receiving a printing job from the host computer 10, and a process of causing the printing engine 21 to perform printing according to the printing job by a control of the controller 22.

The host computer 10 is, for example, a general-purpose personal computer in which a printer driver 40 is installed, and is a host device of the printer 20 that transmits a printing job to the printer 20. The host computer 10 includes a CPU 11, a ROM 12, a RAM 13, a hard disk drive 14, a reading device (data acquiring device) 15, and a communication I/F 16. The host computer 10 with such a configuration is connected to a bus 17 to perform data communication through the bus 17.

The CPU 11 is a control device that controls each configuration of the host computer 10. The ROM 12 is a nonvolatile memory in which a predetermined program for controlling the host computer 10 is recorded, and the RAM 13 is a general-purpose memory used as a working memory or the like.

A driver program DP of the printer 20, a pattern selection table (correspondence information) PT to be described later, and a pattern image database PDB are stored in advance in the hard disk drive 14. The driver program DP is supplied to the host computer 10 by a recording medium M on which the driver program DP is recorded. A program read from the recording medium M by the reading device 15 is stored in the hard disk drive 14. An example of the recording medium M may be an optical disc such as a CD-ROM and a DVD-ROM, a flexible disc, an optical magnetic disc, a USB memory, a memory card, and the like. The pattern selection table PT and the pattern image database PDB are further recorded on the recording medium M, and the pattern selection table PT and the pattern image database PDB are stored in the hard disk drive 14, together with the driver program DP. An aspect in which the driver program DP, the pattern selection table PT, and the pattern image database PDB are supplied to the host computer 10 is not limited thereto. For example, they may be supplied from a predetermined server through an electrical communication line or an optical communication line.

The communication I/F 16 is an interface portion connected to the printer 20 by a cable or a radio communication. The communication between the printer 20 and the host computer 10 is performed through the communication I/F 16.

The CPU 11 of the host computer 10 reads the driver program DP stored in the hard disk drive 14, the printer driver 40 is installed, and the host computer 10 serves as the image processing device 100. Hereinafter, the image processing device 100 will be described.

Figure 2:
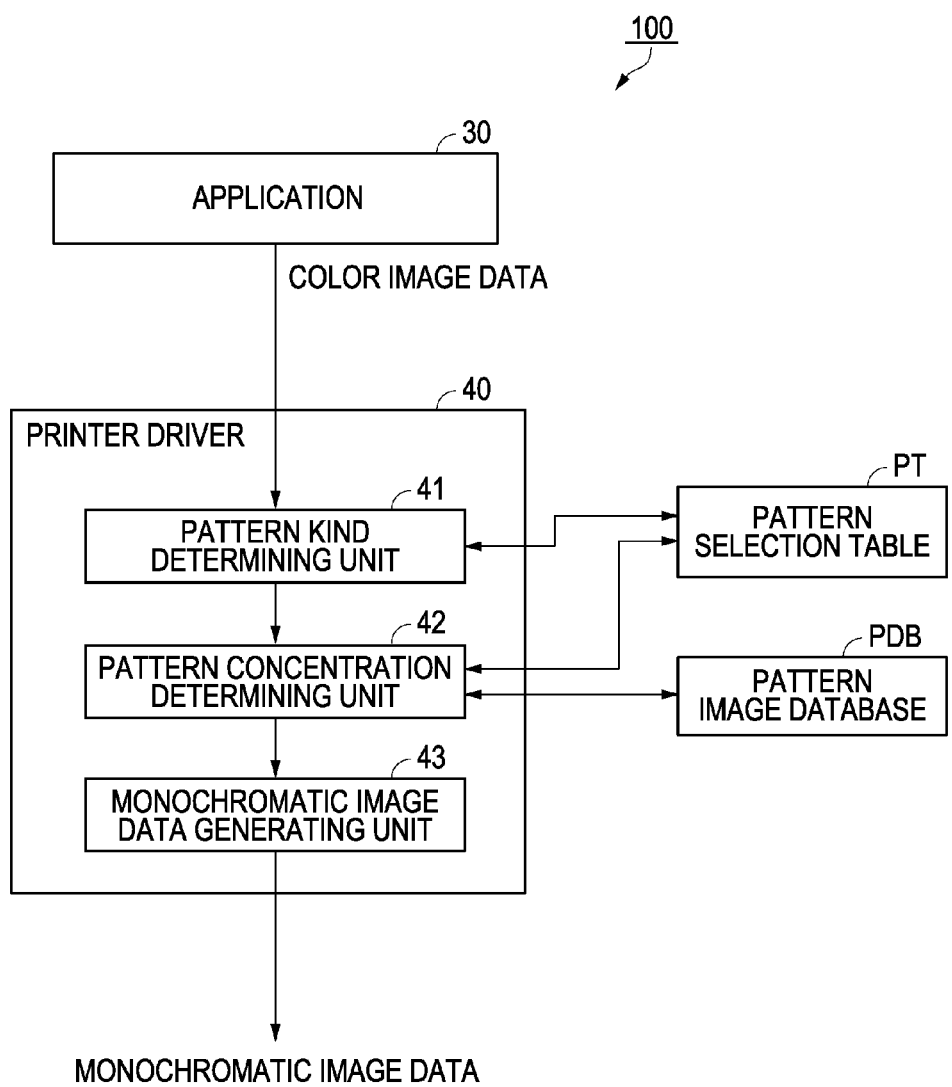
FIG. 2 is a diagram illustrating a configuration of software of an image processing device.

FIG. 2 is a diagram illustrating a configuration of software of the image processing device 100. As shown in FIG. 2, the image processing device 100 has an application 30, and a printer driver 40.

The application 30 is software that is the source of a printing request for the printer 20, such as word processing software or a web browser. The application 30 generates color image data as a printing request and a printing target, and transmits the color image data to the printer driver 40.

The printer driver 40 is software for controlling the printing of the printer 20, generates printing data in a data form which can be processed by the printer 20 from the printing request received from the application 30 and the color image data, and transmits the printing data to the printer 20 through the communication I/F 16. Accordingly, the printer driver 40 causes the printer 20 to perform the printing.

The printer driver 40 of the first embodiment has a function of causing the printer 20 to print the monochromatic image in which color image data is converted into hatched monochromatic image data such that the color difference in the original color image is distinguishable by the shape of the hatching. To realize the hatched monochromatic printing function, the printer driver 40 includes a pattern kind determining unit (pattern determining unit) 41, a pattern concentration determining unit 42, and a monochromatic image data generating unit 43. The CPU 11 executes the driver program DP realized such a configuration of the printer driver 40.

The pattern kind determining unit 41 performs a process of determining the hatch pattern applied to the image area of the color image data, according to the color, particularly, the color tone of the color image of the color image data. In the first embodiment, a plurality of kinds of hatch patterns (monochromatic pattern) representing hatch shapes such as a vertical line, a horizontal line, a grid line, an oblique line, and an oblique grid line by a monochromatic concentration are used. The pattern kind determining unit 41 selects the hatch pattern of the hatch shape applied to the color image, from the plurality of kinds of hatch patterns.

The pattern concentration determining unit 42 performs a process of determining the concentration of the hatch pattern according to the color of the color image of the color image data, particularly, the brightness. The hatch pattern of the first embodiment includes a background area that is a background of the hatch shape, and a foreground area of the hatch shape that is a foreground with respect to the background. The pattern concentration determining unit 42 determines a monochromatic concentration in the background area (hereinafter, referred to as "background concentration"), and a monochromatic concentration in the foreground area (hereinafter, referred to as "foreground concentration").

The monochromatic image data generating unit 43 has the hatch shape determined by the pattern kind determining unit 41, and performs a process of applying the hatch pattern having the background concentration and the foreground concentration determined by the pattern concentration determining unit 42 to the image area of the color image. Accordingly, the monochromatic image data generating unit 43 generates the hatched monochromatic image data.

The processes performed by the pattern kind determining unit 41 and the pattern concentration determining unit 42 described above are performed according to the contents of the pattern selection table PT and the pattern image database PDB. Next, a method of converting the color image data into the hatched monochromatic image data will be described. First, the pattern selection table PT and the pattern image database PDB will be described. In the following description, the color image data has RGB values representing colors of R (red), G (green), and B (blue) by 8-bit gradation values "0 to 255" for each pixel of the color image. The monochromatic image data has a K value representing a color of K (black) by 8-bit gradation values "0 to 255", that is, a concentration of a K monochromatic color, for each pixel of the monochromatic image. In the RGB values of the color image data, (R, G, B)=(255, 255, 255) corresponds to white, and (R, G, B)=(0, 0, 0) corresponds to black. In the K value, K=255 corresponds to black, and K=0 corresponds to white.

Figure 3:
FIG. 3 is a diagram illustrating an example of a pattern selection table.

FIG. 3 is a diagram illustrating an example of the pattern selection table PT. As shown in FIG. 3, in the pattern selection table PT, the pattern kind, the background concentration, and the foreground concentration are associated in advance with the RGB values that are color values.

At the section of the pattern kind of the pattern selection table PT, as described above, the kinds of hatch patterns corresponding to the color values are designated from the plurality of kinds of hatch patterns such as the vertical line, the horizontal line, the grid line, the oblique line, and the oblique grid line. At the section of the background concentration, the value of the background concentration corresponding to the color value is designated. At the section of the foreground concentration, the value of the foreground concentration corresponding to the color value is designated.

By the pattern selection table PT, the hatch patterns of the hatch shapes corresponding to the RGB values of the color image, the background concentration, and the foreground concentration are determined. Specifically, when the color image data is converted into the monochromatic image data, the pattern kind determining unit 41 selects the hatch pattern of the hatch shape designated at the pattern kind of the pattern selection table PT in the image area of the color image data with reference to the pattern selection table PT. The pattern concentration determining unit 42 determines the background concentration of the hatch pattern as the concentration designated at the section of the background concentration of the pattern selection table PT, and determines the foreground concentration of the hatch pattern as the foreground concentration designated at the section of the foreground concentration of the pattern selection table PT, with reference to the pattern selection table PT.

In the pattern image database PDB, the image data of the hatch pattern is stored in advance for each pattern kind such as the vertical line, the horizontal line, the grid line, the oblique line, and the oblique grid line. The hatch pattern is an image with a predetermined size of, for example, 32×32 pixels or the like, and includes at least information representing the background area and the foreground area in the image area of the hatch pattern. Accordingly, as will be described later, when the hatch pattern is applied to the image area, the pattern concentration determining unit 42 can determine whether or not the target pixel in the image area corresponds to any one of the background area and the foreground area, with reference to the pattern image database PDB.

Next, an outline of a process using the pattern selection table PT and the pattern image database PDB will be described. Herein, in the whole image area, a color image CP having a color value of (R, G, B)=(0, 0, 239) will be described as an example.

Figure 4A:
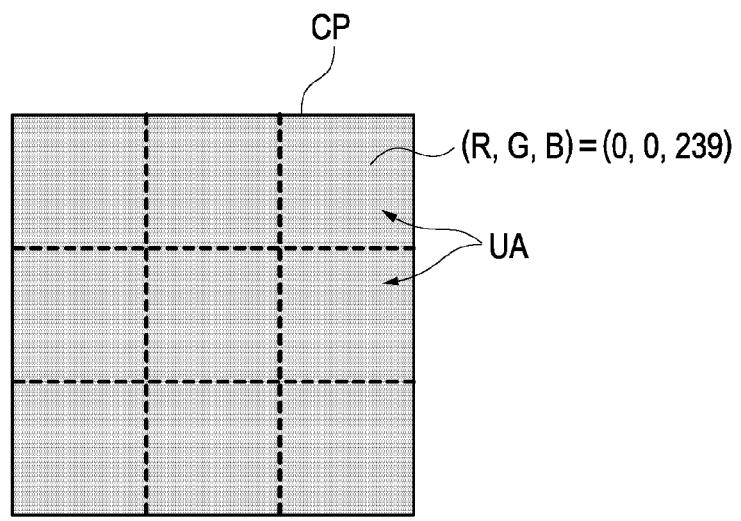
FIG. 4A and FIG. 4B are diagrams illustrating assignment of a hatch pattern.
Figure 4B:
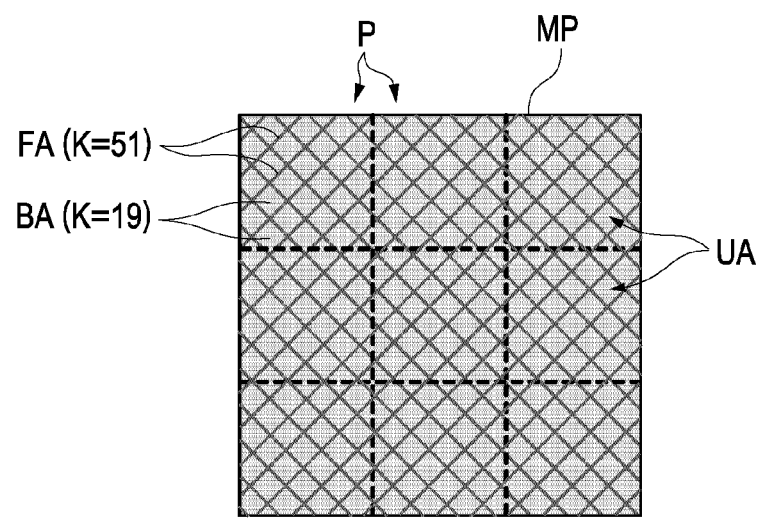

As shown in FIG. 4A, the hatch pattern may be assigned to each unit area UA formed by partitioning the image area of the color image CP by the same sizes as that of the hatch pattern. The kind of the hatch pattern assigned to the unit area UA may be determined according to the pattern selection table PT. According to the pattern selection table PT shown in FIG. 3, the pattern kind corresponding to the RGB value of the color image, that is, the color value of (R, G, B)=(0, 0, 239) is the "oblique grid line", and the hatch pattern P of the "oblique grid line" is applied to the color image CP. Accordingly, as shown in FIG. 4B, the hatch pattern of the oblique grid line registered in the pattern image database PDB is applied for each unit area UA to the monochromatic image MP formed by converting the color image CP.

According to the pattern selection table PT shown in FIG. 3, the background concentration corresponding to (R, G, B)=(0, 0, 239) is determined as K=19, and the foreground concentration is determined as K=51. Accordingly, the concentration of the background area BA of the monochromatic image MP is K=19, and the concentration of the foreground area FA is K=51.

In such a manner, the hatch pattern P determined by the pattern selection table PT and the pattern image database PDB is applied to each unit area UA. In FIG. 4A and FIG. 4B, the hatch pattern P is applied only to one unit area UA, but actually, the hatch pattern P is applied to each the unit area UA.

The pattern selection table PT used as described above is preset in advance to satisfy the following requirements (1) to (5).

Figure 5:
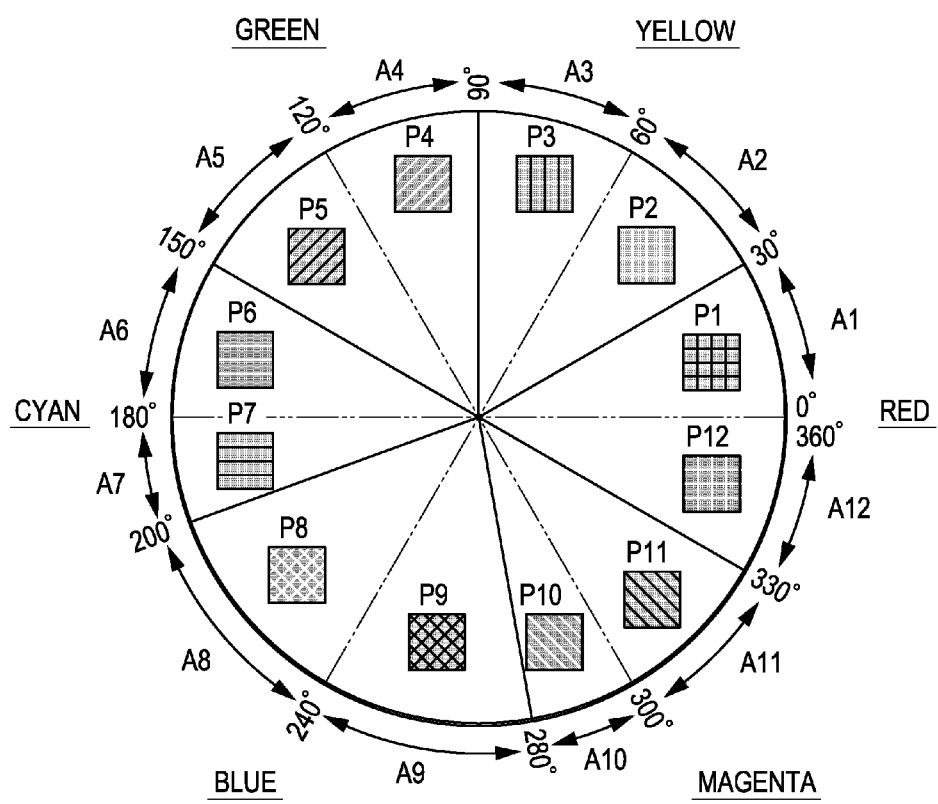
FIG. 5 is a diagram illustrating an example of correspondence between colors on a color circle and hatch patterns.

(1) Requirement for Assignment of Hatch Shape corresponding to Color Tone
(2) Requirement for Change of Background Concentration corresponding to Brightness
(3) Requirement for Line Density of Hatch Shape corresponding to Brightness
(4) Requirement for Assignment of Hatch Shape between Colors in Complementary Relationship
(5) Requirement for Assignment of Hatch Shape between Colors of Color Areas adjacent to each other (1) Requirement for Assignment of Hatch Shape Corresponding to Color Tone A predetermined hatch pattern of the hatch shape is assigned in which the color circle of colors are partitioned to each color area formed by partitioning the color circle of colors for a color tone. FIG. 5 shows an example of correspondence between the color tone and the hatch pattern in the color circle. In the example of FIG. 5, the color tone in the color circle is partitioned into color areas A1 to A12, the hatch patterns P1 to P12 are assigned corresponding to the color areas A1 to A12. The color areas A1 and A12 correspond to a red-based color, the color area A1 corresponds to a color angle equal to or more than 0° and less than 30°, and the color area A12 corresponds to a color angle equal to or more than 330° and less than 360°. The color areas A2 and A3 correspond to a yellow-based color, the color area A2 corresponds to a color angle equal to or more than 30° and less than 60°, and the color area A3 corresponds to a color angle equal to or more than 60° and less than 90°. The color areas A4 and A5 correspond to a green-based color, the color area A4 corresponds to a color angle equal to or more than 90° and less than 120°, and the color area A5 corresponds to a color angle equal to or more than 120° and less than 150°. The color areas A6 and A7 correspond to a cyan-based color, the color area A6 corresponds to a color angle equal to or more than 150° and less than 180°, and the color area A7 corresponds to a color angle equal to or more than 180° and less than 200°. The color areas A8 and A9 correspond to a blue-based color, the color area A8 corresponds to a color angle equal to or more than 200° and less than 240°, and the color area A9 corresponds to a color angle equal to or more than 240° and less than 280°. The color areas A10 and A11 correspond to a magenta-based color, the color area A10 corresponds to a color angle equal to or more than 280° and less than 300°, and the color area A11 corresponds to a color angle equal to or more than 300° and less than 330°.

(2) Requirement for Change of Background Concentration Corresponding to Brightness In the correspondence between the color value and the background concentration, the background concentration is set to be changed according to the brightness of the color value. Accordingly, for example, between two colors included in the color image, even when the hatch shapes of the hatch patterns P determined by different requirements are the same, the color difference in the original color image is reflected as the change of the background concentration to the monochromatic image. In the setting of Requirement (2), a gray value to which brightness is reflected, brightness in an L*a*b* color system, or the like may be used. The color value and the background concentration are set such that the background concentration is changed when such a value is changed.

An average brightness of the RGB values of the color image in the unit area UA before applying the hatch pattern P and an average brightness of the background concentration and the foreground concentration of the hatch pattern P in the unit area UA after applying the hatch pattern P are set to be equal to each other. That is, in the hatch pattern P with a predetermined size, the brightness when the RGB values of the color image are averaged with respect to the pattern area, and the brightness when the K values of the monochromatic image are averaged with respect to the pattern area are equal to each other. When the fact that the brightness is the same means that the brightness is substantially the same. The invention is not limited to the same of the brightness, and includes a case where the brightness is different as much as a human recognizes the brightness is the same. Accordingly, when the color image data is converted into the monochromatic image data, the brightness is preserved for each unit area UA to which the hatch pattern P is applied. For example, when the brightness of the color image is spatially changed, the brightness of the monochromatic image is also changed for each unit area UA according to the change of the brightness of the color image, and thus the spatially change of the brightness of the color image is reflected to the monochromatic image.

(3) Requirement for Line Density of Hatch Shape Corresponding to Brightness

In the brightness of the color of the color circle and the line density of the hatch shape of the hatch pattern P, the line density is set to be higher as the brightness of the color becomes lower. For example, as shown in the color area A3 of yellow and the color area A9 of blue in FIG. 5, the hatch shape of the "vertical line" is assigned to the color area A3 of yellow, and the hatch shape is assigned to the "grid line" including the horizontal line in addition to the vertical line is assigned to the color area A9 of blue. That is, the hatch pattern P of the hatch shape with higher line density is assigned to blue with brightness lower than yellow. Accordingly, the difference in brightness of the original color image is the difference in line density of the hatch shape in the hatch pattern P, and is reflected to the monochromatic image.

(4) Requirement for Assignment of Hatch Shape between Colors in Complementary Relationship Between two colors complementary, the relationship formed by rotating the same hatch shape is set to be, that is, the hatch pattern P in which only the angles of the hatch shapes are different. As shown in FIG. 5, the hatch shape of the hatch pattern P5 corresponding to the color angle, for example, 120° to 150° is oblique lines from upper right to lower left. Meanwhile, the hatch shape of the hatch pattern P11 corresponding to the color angle, for example, 300° to 330° is oblique lines from upper left to lower right.

As described above, between the colors complementary to each other, the relationship of the hatch pattern P formed by rotating the hatch shapes for each other is formed, and thus the relationship complementary to each other is reflected to the monochromatic image in two colors having the complementary relationship with respect to the original color image. In the first embodiment, as shown in FIG. 5, Requirement 4 is not applied to all the areas A1 to A12, it is applied only between the color area A4 and the color area A10 having the complementary relationship, and between the color area A5 and the color area A11, but there is no problem even when it is applied to all the color areas A.

(5) Requirement for Assignment of Hatch Shape between Colors of Color Areas Adjacent to Each Other In two color areas A adjacent to each other, the hatch pattern P corresponding to one color area A is set such that the foreground concentration is lower than the background concentration, and the hatch pattern P corresponding to the other color area A is set such that the foreground concentration is higher than the background concentration. In FIG. 5, in the hatch pattern P1 corresponding to the color area A1 of the color of, for example, 0° to 30°, the pattern kind is the "grid line", the foreground concentration is higher than the background concentration, and the concentration of the lines constituting the hatch shape is closer to black than the background. Meanwhile, corresponding to the color (red) with the same base as that of the color area A1, in the hatch pattern P12 corresponding to the color 330° to 360° of the color area A12 adjacent to the color area A1, the pattern kind is the "grid line", the foreground concentration is lower than the background concentration, and the concentration of the lines constituting the hatching is closer to white than the background. As described above, between the colors of the color areas A adjacent to each other, the foreground concentration has the relationship of the opposite size with respect to the background concentration, and thus the color difference between two colors of the color areas A adjacent to each other is reflected to the monochromatic image.

Next, a process performed by the image processing device 100 described above will be described in detail with reference to the flowchart shown in FIG. 6.

Figure 6:
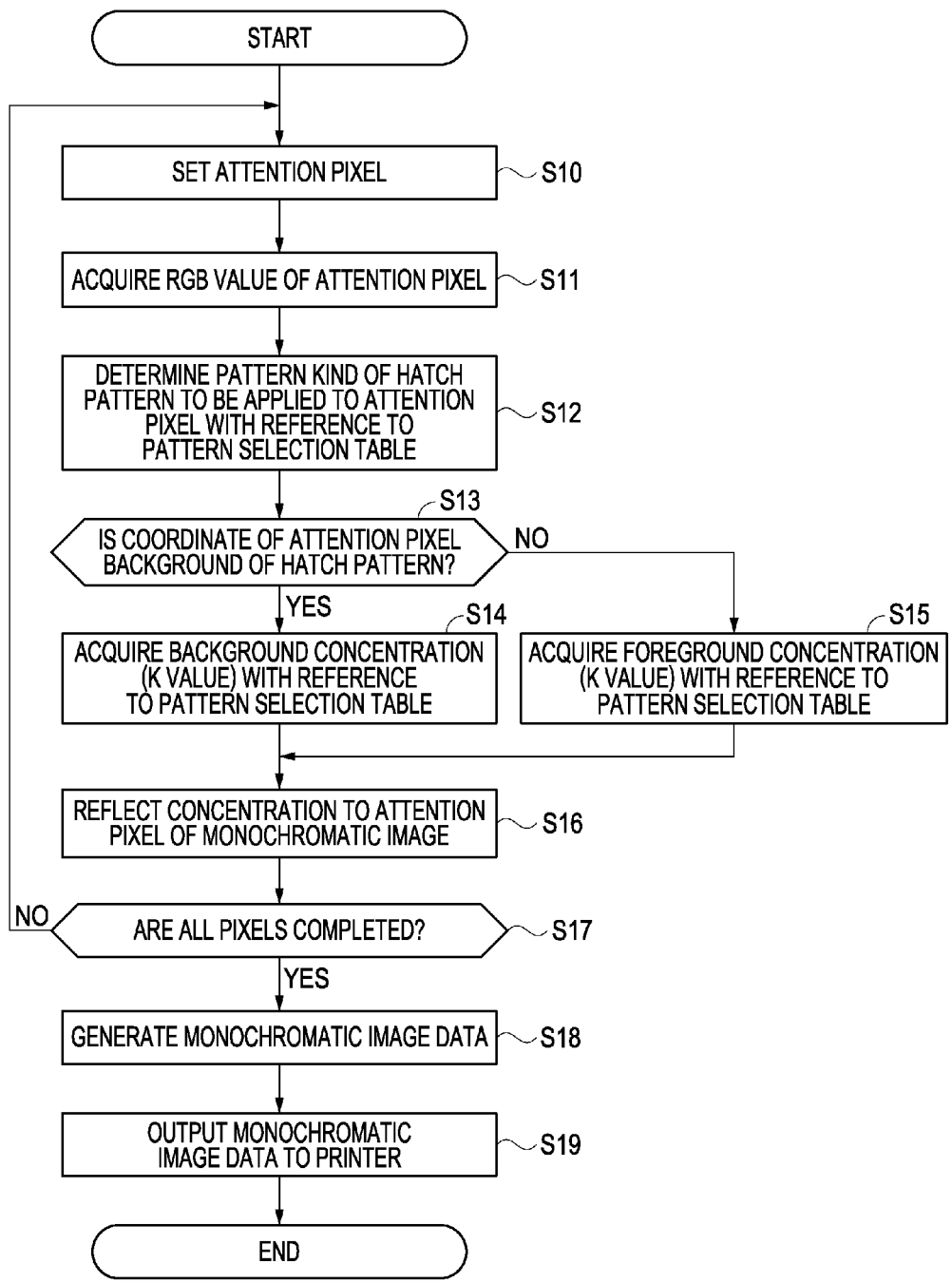
FIG. 6 is a flowchart illustrating flow of a process performed by the image processing device.

For example, when the printer driver 40 receives a printing instruction of monochromatic printing of the color image data from the application 30, a process shown in FIG. 6 is started. When the process is started, the pattern kind determining unit 41 sets a target pixel in the image area of the color image data (Step S10), and acquires RGB value of the target pixel from the color image data (Step S11). The pattern kind determining unit 41 determines the pattern kind corresponding to the acquired RGB value with reference to the pattern selection table PT (Step S12).

Figure 7:
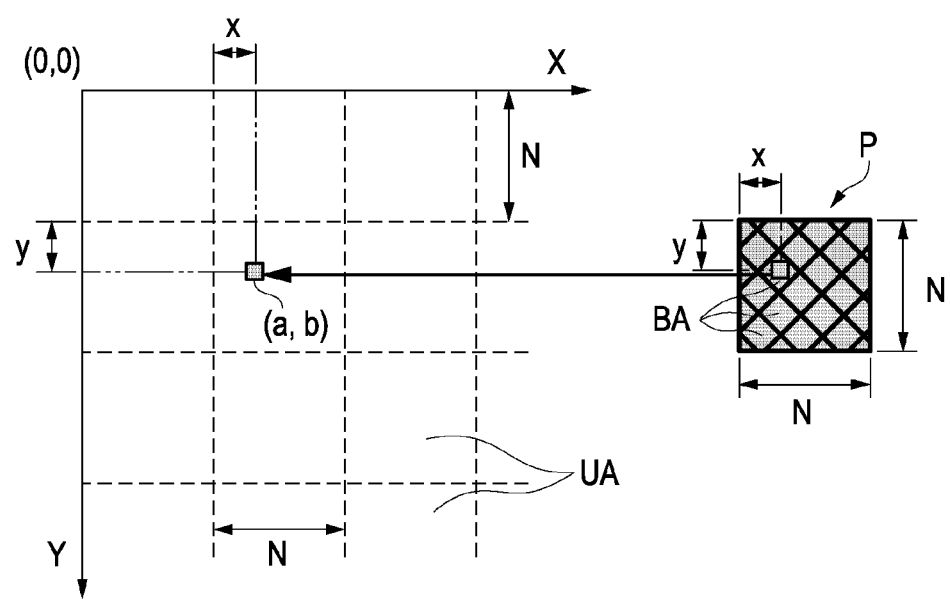
FIG. 7 is a diagram illustrating assignment of the hatch pattern with respect to a target pixel.

Then, the pattern concentration determining unit 42 determines whether or not the coordinate of the target pixel corresponds to the background area of the hatch pattern P (Step S13). As described with reference to FIG. 4A and FIG. 4B, the hatch pattern P is assigned to the unit area UA with a predetermined size in the image area of the color image. Accordingly, herein, it is determined whether the target pixel is at the position corresponding to the background or is at the position corresponding to the foreground in the hatch pattern P assigned to each unit area UA. Specifically, as shown in FIG. 7, when the coordinate of the target pixel is (a, b) and the size of the hatch pattern P is N×N pixels, the relative coordinate (x, y) of the target pixel in the hatch pattern P is acquired by the following formulas (2) and (3). In the following formulas, "mod" is an operator that returns the remainder of a division. The pattern concentration determining unit 42 determines whether the relative coordinate (x, y) corresponds to any one of the background and the foreground in the hatch pattern P with reference to the image data of the hatch pattern P registered in the pattern image database PDB.

$$x = a \bmod N \quad (2)$$

$$y = b \bmod N \quad (3)$$

When the target pixel corresponds to the background (Step S13: Yes), the pattern concentration determining unit 42 acquires the K value of the background concentration corresponding to the RGB value of the target pixel with reference to the pattern selection table PT (Step S14). Meanwhile, when the target pixel corresponds to the foreground (Step S13: No), the pattern concentration determining unit 42 acquires the K value of the foreground concentration corresponding to the RGB value of the target pixel with reference to the pattern selection table PT (Step S15). In the example shown in FIG. 7, the relative coordinate (x, y) corresponding to the target pixel (a, b) corresponds to the background area BA of the hatch pattern P, and thus the background concentration is acquired for the target pixel.

When the K value of the background concentration or the foreground concentration is acquired in Step S14 or Step S15, the monochromatic image data generating unit 43 applies the K value of the acquired concentration to the pixel corresponding to the target pixel in the image area of the monochromatic image (Step S16). Accordingly, the pixel corresponding to the target pixel in the monochromatic image has the K value of the concentration corresponding to the hatch pattern P of the kind determined in Step S12.

Then, the monochromatic image data generating unit 43 determines whether or not the process of Step S10 to S16 is performed for all the pixels of the color image (Step S17). When the process is not completed for all the pixels (Step S17: No), the process returns to Step S10. For example, the pattern kind determining unit 41 scans the target pixel in a raster direction to set a new target pixel, and the process since Step S11 is performed on the new target pixel. When the process is completed for all the pixels (Step S17: Yes), all the pixels of the monochromatic image have the K value of the concentration corresponding to the hatch pattern P of the kind determined in Step S12, and the monochromatic image data generating unit 43 generates monochromatic image data of the monochromatic image (Step S18). The generated monochromatic image data is output to the printer 20 by the printer driver 40 (Step S19). Accordingly, as the monochromatic printing of the color image data transmitted from the application 30, the hatched monochromatic image corresponding to the color of the color image is printed.

Hereinafter, advantages of the first embodiment will be described.

(1) According to the image processing device 100 of the first embodiment, by Requirement (1) of the pattern selection table PT, the monochromatic image data subjected to the hatching of the hatch shape corresponding to the color of the color image is generated from the color image data. Accordingly, it is possible to obtain the image data of the monochromatic image from which the color of the original color image is distinguishable from the shape of the hatch pattern P, and thus it is possible to print the monochromatic image.

(2) By Requirement (2) of the pattern selection table PT, even when the pattern kinds of the hatch patterns P applied by the other requirements are the same, the color difference in the original color image is reflected as the difference in background concentration to the monochromatic image. Accordingly, it is possible to obtain the image data of the monochromatic image from which the color of the original color image is distinguishable, from the background concentration of the hatch shape.

The brightness of the color image is preserved in the monochromatic image for each unit area UA to which the hatch pattern P is applied. For example, when the brightness of the color image is spatially changed, the brightness of the monochromatic image is also changed for each unit area UA according to the change of the brightness of the color image, and thus it is possible to obtain the monochromatic image with excellent reproducibility of the brightness of the color image.

(3) By Requirement (3) of the pattern selection table PT, the difference in brightness of the original color image is the difference in line density of the hatch shape and is reflected to the monochromatic image, and the hatch shape with higher line density is applied as the brightness becomes lower and the color becomes darker. According to the monochromatic image, it is possible to give the user who sees the monochromatic image the impression close to the color image.

(4) By Requirement (4) of the pattern selection table PT, the hatch shapes are in the relationship of rotation for each other between two colors complementary. Accordingly, the user who sees the monochromatic image can recognize the complementary relationship between two colors in the original color image from the monochromatic image.

(5) By Requirement (5) of the pattern selection table PT, the foreground concentration is the opposite value to the background concentration between the colors of the color areas A adjacent to each other, and thus the difference in color is reflected to the monochromatic image between the colors of the color areas A adjacent to each other. Accordingly, even in two colors which are not easily distinguishable in the color image since the color areas A are adjacent to each other, it is possible to easily distinguish the difference in color of the monochromatic image.

Second Embodiment

In the first embodiment, the aspect of converting the color image of the color image data into the image data of the hatched monochromatic image has been described. In the second embodiment, for each of one or more object images (color images) included in the color image data, the kind of the object image such as a text attribute representing characters and symbol data, a figure attribute representing vector data, and a graphic attribute representing bitmap data is determined, and the hatch shape is applied according to the kind of the attribute of the object image. Hereinafter, the same reference numerals and signs are given to the same configurations as those of the first embodiment, and the detailed description thereof is not repeated.

Figure 8:
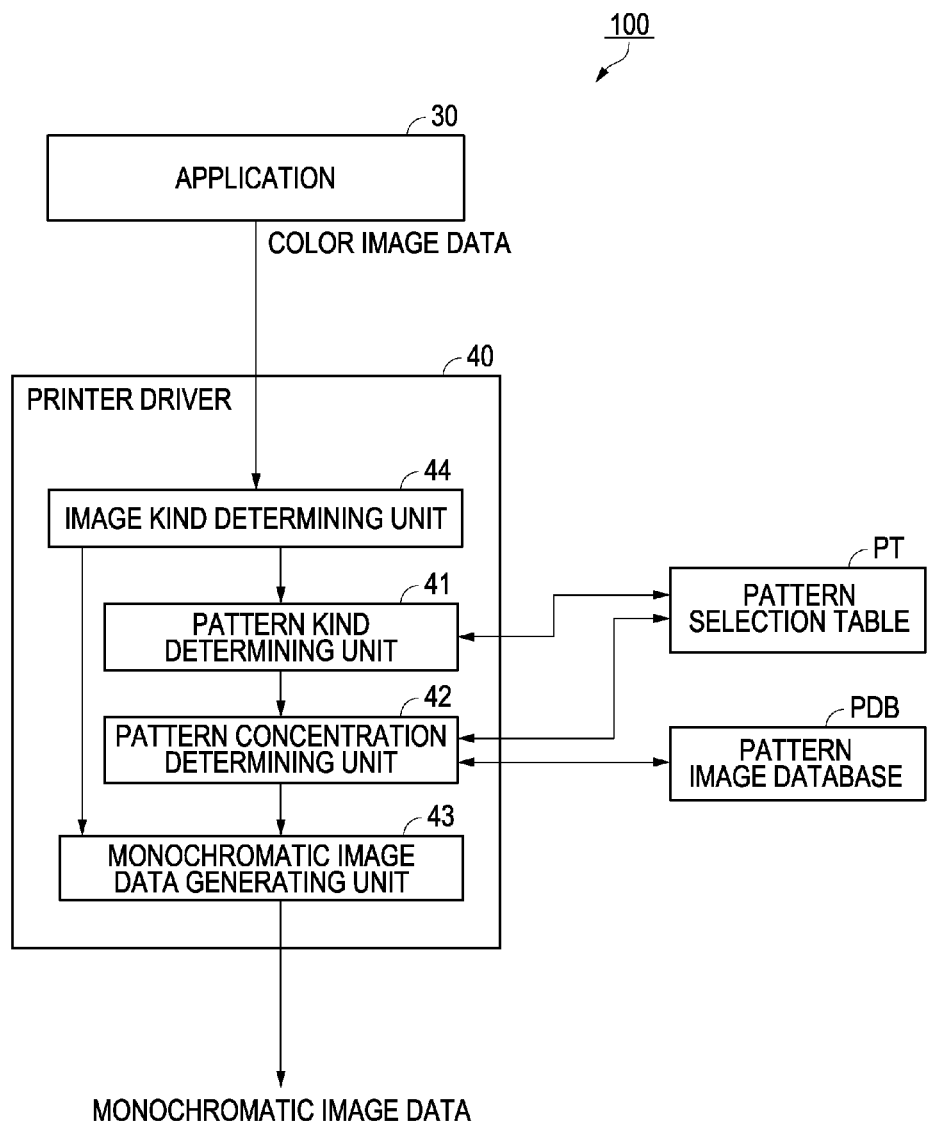
FIG. 8 is a diagram illustrating a configuration of an image processing device according to a second embodiment.

FIG. 8 is a configuration of an image processing device 100 of the second embodiment. As shown in FIG. 8, the printer driver 40 of the image processing device 100 includes an image kind determining unit 44, a pattern kind determining unit 41, a pattern concentration determining unit 42, and a monochromatic image data generating unit 43.

The image kind determining unit 44 determines the kind of the object image included in the color image data. For example, it is determined whether or not the kind of the object image is the text attribute or the graphic attribute. For example, the determination is performed with reference to attribute information of the object image included in the color image data.

For example, in the object image other than the text attribute or the graphic attribute, that is, the object image with the figure attribute in the object image included in the color image data, the pattern kind determining unit 41 and the pattern concentration determining unit 42 apply the hatch shape, to thereby convert the object image into the hatched monochromatic object image.

Meanwhile, the monochromatic image data generating unit 43 converts the object image with the text attribute or the graphic attribute into the monochromatic object image by the gray conversion.

The monochromatic image data generating unit 43 generates the monochromatic image data including the gray-converted object image for the text attribute or the graphic attribute, and generates the monochromatic image data including the monochromatic image data including the hatched object image for the attribute other than the text attribute and the graphic attribute.

According to the second embodiment, the object image with the figure attribute in the object image included in the color image data is converted into the hatched monochromatic image, and thus it is possible to obtain the same advantage as that of the first embodiment. In addition, the color image data is converted into the hatched monochromatic object image according to the kind of the object image included in the color image data. Accordingly, even when the object images with the same color are overlapped with each other, the object images in which the kinds of the attributes of the object images are different from each other are not embedded, and it is possible to obtain the image data of the monochromatic image from which the original color image is easily distinguishable.

Third Embodiment

In the third embodiment, it is determined whether or not the color image of the color image data includes a prohibiting image for which the application of the hatch shape is prohibiting in advance, and the color image is converted into the monochromatic image by the gray conversion without applying the hatch shape to the area of the prohibiting image. For example, the prohibiting image is an image to which a specific mark such as a mark of a corporation name logo or a specific shape such a hatch shape is applied.

Figure 9:
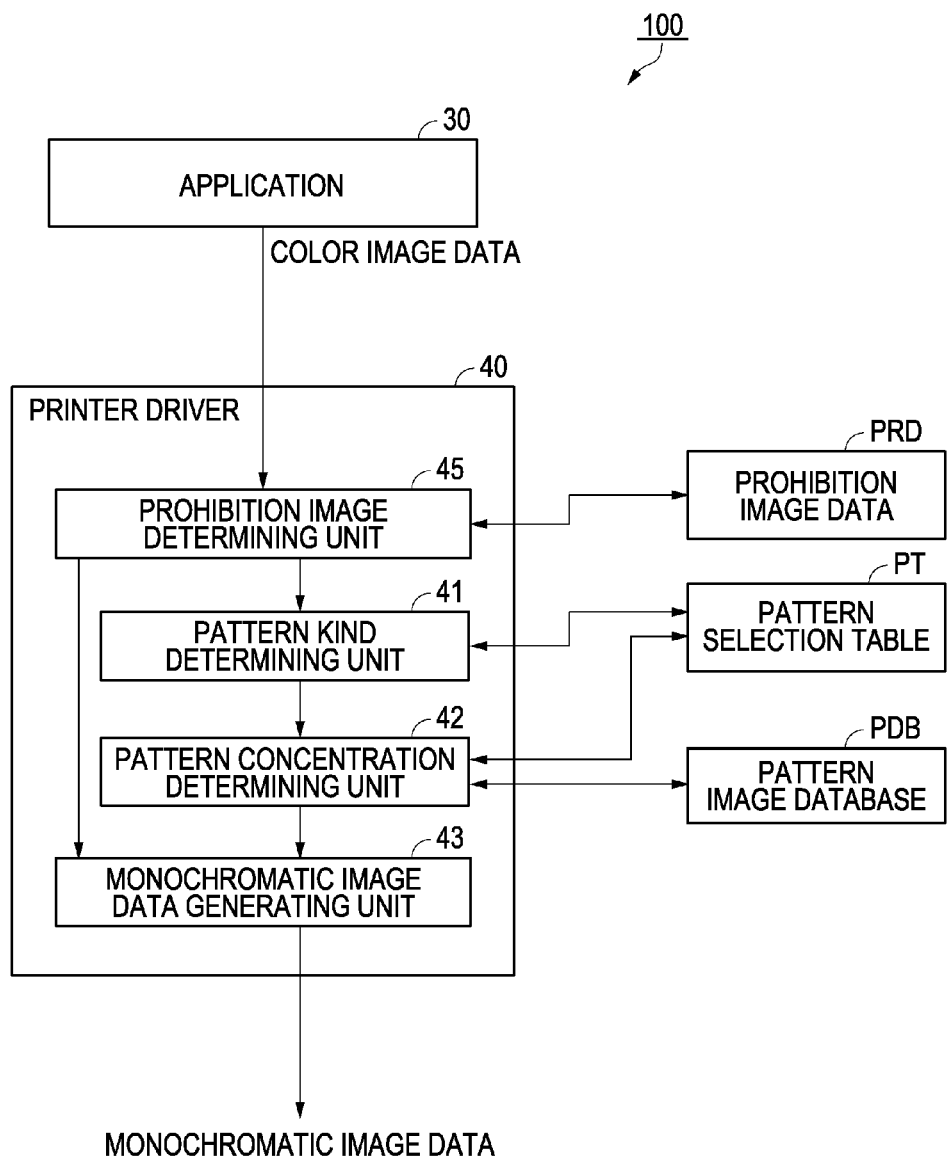
FIG. 9 is a diagram illustrating a configuration of an image processing device according to a third embodiment.

FIG. 9 shows a configuration of an image processing device 100 according to the third embodiment. As shown in FIG. 9, the printer driver 40 of the image processing device 100 includes a prohibiting image determining unit 45, a pattern kind determining unit 41, a pattern concentration determining unit 42, and a monochromatic image data generating unit 43.

The prohibiting image determining unit 45 determines whether or not the color image of the color image data includes the prohibiting image. For example, a template of the prohibiting image is registered in advance as prohibiting image data PRD in the hard disk drive 14, and the determination is performed by template matching between the registered template and the color image.

In the image area excluding the prohibiting image in the color image of the color image data, the color image is converted into the hatched monochromatic image by the pattern kind determining unit 41 and the pattern concentration determining unit 42 in the same manner as that of the first embodiment.

Meanwhile, in the image area of the prohibiting image, the monochromatic image data generating unit 43 converts the color image into the monochromatic image by the gray conversion. The monochromatic image data generating unit 43 generates monochromatic image data formed by synthesizing the monochromatic image of the image area of the prohibiting image with the hatched monochromatic image in the image area other than the prohibiting image.

According to the third embodiment, the hatch shape is not applied to the area of the prohibiting image in the color image, and the color image is converted into the monochromatic image by the gray conversion. Accordingly, a defect of damaging the expression of the image to which the mark such as the logo representing the corporation name and the specific shape such as the hatch shape are applied by the application of the hatch shape is removed, and convenience for the user is improved.

Above all, as a processing method without attaching the hatch shape to the prohibiting image, for example, when the color image data includes a plurality of object images, the hatch shape may not be applied to the whole area of the object image as well as the prohibiting image area, with respect to the object image including the prohibiting image.

Fourth Embodiment

Figure 12:
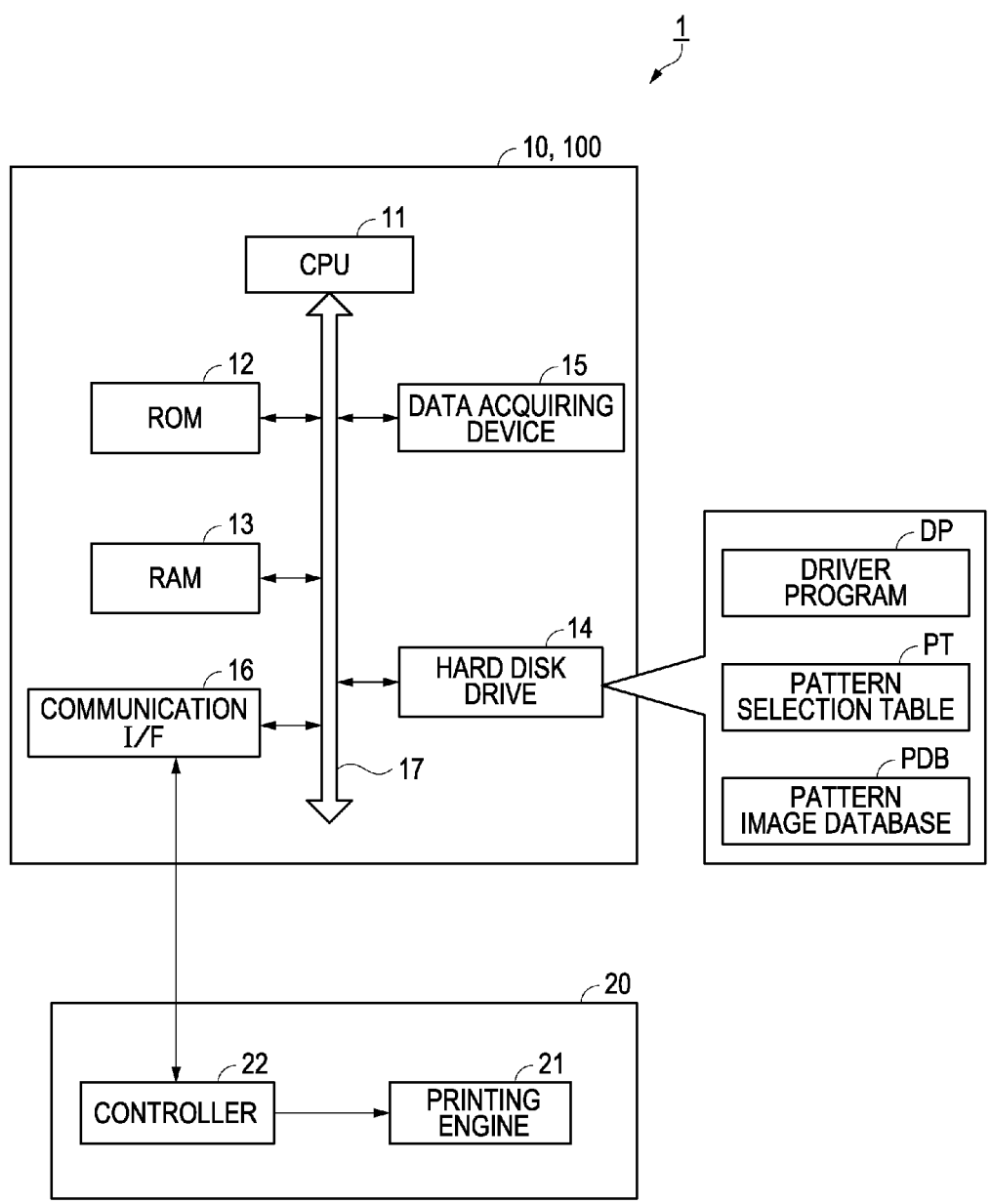
FIG. 12 is a diagram illustrating a schematic configuration of a printing system according to a fourth embodiment.

FIG. 12 is a diagram illustrating a schematic configuration of a printing system 1 according to the fourth embodiment. As shown in FIG. 12, the printing system 1 includes a host computer 10 and a printer 20, and the host computer 10 and the printer 20 are connected to each other to perform data communication.

The printer 20 includes a printing engine that performs printing on a medium such as a sheet, and a controller 22 that controls an operation or the like of the printing engine 21. The printer 20 performs a process of receiving a printing job from the host computer 10, and a process of causing the printing engine 21 to perform printing according to the printing job by a control of the controller 22. In the fourth embodiment, it is assumed that the printer 20 is a laser printer which attaches toner to a photoreceptor using laser light, and transfers it to paper by heat and pressure to perform printing.

The host computer 10 is a general-purpose personal computer in which a printer driver 40 (FIG. 13) corresponding to the printer 20 is installed in advance, and is a host device of the printer 20 that transmits a printing job to the printer 20. The host computer 10 includes, as hardware, a CPU (Central Processing Unit) 11, a ROM (Read Only Memory) 12, a RAM (Random Access Memory) 13, a hard disk drive 14, a data acquiring device 15, and a communication I/F 16. The host computer 10 with such a configuration is connected to a bus 17 to perform data communication through the bus 17.

The CPU 11 is a control device that controls each configuration of the host computer 10. The ROM 12 is a nonvolatile memory in which a predetermined program for controlling the host computer 10 is recorded, and the RAM 13 is a general-purpose memory used as a working memory or the like.

The data acquiring device 15 acquires a driver program DP of the printer 20, data such as a pattern selection table PT and a pattern image database PDB to be described later through reading of a recording medium such as a CD-ROM or network communication with an external server.

A driver program DP acquired by the data acquiring device 15, a pattern selection table PT, and a pattern image database PDB are stored in the hard disk drive 14.

The communication I/F 16 is an interface portion connected to the printer 20 by a cable or a radio communication. The communication between the printer 20 and the host computer 10 is performed through the communication I/F 16.

The CPU 11 of the host computer 10 installs the data of the driver program DP stored in the hard disk drive 14, and controls the host computer 10 to serve as the image processing device 100. Hereinafter, the image processing device 100 will be described.

Figure 13:
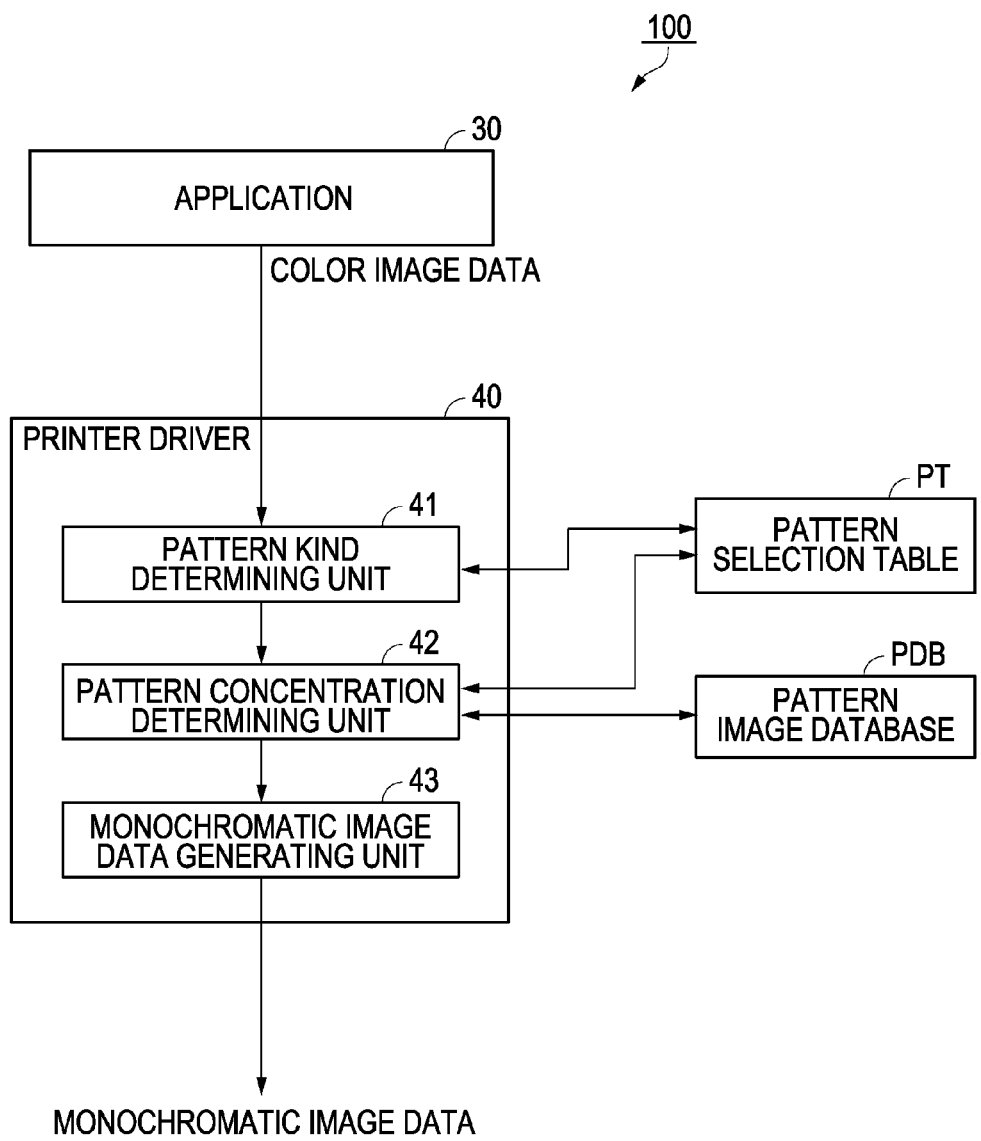
FIG. 13 is a diagram illustrating a configuration of software of an image processing device.

FIG. 13 is a diagram illustrating a configuration of software of the image processing device 100. As shown in FIG. 13, the image processing device 100 has an application 30, and a printer driver 40.

The application 30 is software that is the source of a printing request for the printer 20, such as word processing software or a web browser. The application 30 generates color image data as a printing request and a printing target, and transmits the color image data to the printer driver 40.

In the fourth embodiment, the application 30 performs a printing process by a graphic device interface (GDI) of an operating system (OS) that is software for controlling a basic operation of the host computer 10. Accordingly, the GDI transmits a drawing command to the printer driver 40, and the printer driver 40 acquires the printing requirement and the color image data as a printing target, but the invention is not limited thereto.

The printer driver 40 is software for controlling the printing of the printer 20. The printer driver 40 generates printing data (job data) in a data form which can be processed by the printer 20 from the printing request received from the application 30 and the image data, and transmits the printing data to the printer 20 through the communication I/F 16. Accordingly, the printer driver 40 causes the printer 20 to perform the printing.

The printer driver 40 of the fourth embodiment has a function of causing the printer 20 to print the monochromatic image in which color image data is converted into hatched monochromatic image (single-color image) data such that the color difference in the original color image is distinguishable by the shape of the hatching. To realize the hatched monochromatic printing function, the printer driver 40 includes a pattern determining unit 41, a pattern concentration determining unit 42, and a monochromatic image data generating unit 43. Such a function is realized in cooperation of the hardware described above and the software such as the driver program DP.

The pattern determining unit 41 performs a process of determining the hatch pattern applied to the image area of the color image data, according to the color, particularly, the color tone of the color image of the color image data. In the fourth embodiment, a plurality of kinds of hatch patterns (monochromatic patterns) representing hatch shapes such as a vertical line, a horizontal line, a grid line, an oblique line, and an oblique grid line by a monochromatic concentration are used. The pattern determining unit 41 selects the hatch pattern of the hatch shape applied to the color image from the plurality of kinds of hatch patterns with reference to the pattern selection table PT.

The pattern concentration determining unit 42 performs a process of determining the concentration of the hatch pattern according to the color of the color image of the color image data, particularly, the brightness. The hatch pattern of the fourth embodiment includes a background area that is a background area of the hatch shape, a pattern area of the hatch shape that is drawn to overlap with the background and is a foreground for the background, and a boundary area between the background area and the pattern area. When the difference in concentration between the background area and the pattern area is more than a predetermined value, the pattern concentration determining unit 42 has a function of determining the concentration of the boundary area to be smaller than any concentration of the background area and the pattern area.

In the fourth embodiment, the pattern concentration determining unit 42 determines the concentration of each area with reference to the pattern selection table PT and the pattern image database PDB. That is, as shown in FIG. 14, the pattern selection table PT includes a monochromatic concentration in the background area (hereinafter, referred to as "background concentration"), a monochromatic concentration in the pattern area (hereinafter, referred to as "foreground concentration"), and a monochromatic concentration in the boundary area (hereinafter, referred to as "boundary concentration").

In the fourth embodiment, as shown in FIG. 14, the difference between the background concentration and the foreground concentration is equal to or more than a predetermined value, and the boundary concentration is regulated to be smaller than any one of the background concentration and the foreground concentration, that is, to be bright. Accordingly, any pattern has the difference in concentration equal to or larger than a predetermined value between the background area and the pattern area, and the boundary area is brighter than the background area and the pattern area. Therefore, a person who sees the monochromatic image has an illusion of feeling that any dark area of the background area and the pattern area is even darker by a contrast effect of color (a brightness contrast).

The monochromatic image data generating unit 43 has the hatch shape determined by the pattern determining unit 41, and performs a process of applying the hatch pattern having the concentration determined by the pattern concentration determining unit 42 to the image area of the color image. Accordingly, the monochromatic image data generating unit 43 generates the hatched monochromatic image data. In the fourth embodiment, the monochromatic image based on black is assumed as the monochromatic image, but the invention is not limited thereto. An image based on red or blue may be assumed.

Next, a method of converting the color image data into the hatched monochromatic image data will be described. First, the pattern selection table PT and the pattern image database PDB will be described. In the following description, the color image data has RGB values representing colors of R (red), G (green), and B (blue) by 8-bit gradation values "0 to 255" for each pixel of the color image. The monochromatic image data has a K value representing a color of K (black) by 8-bit gradation values "0 to 255", that is, a concentration of a K monochromatic color, for each pixel of the monochromatic image. In the RGB values of the color image data, (R, G, B)=(255, 255, 255) corresponds to white, and (R, G, B)=(0, 0, 0) corresponds to black. In the K value, K=255 corresponds to black, and K=0 corresponds to white.

FIG. 14 is a diagram illustrating an example of the pattern selection table PT. As shown in FIG. 14, in the pattern selection table PT, the pattern kind, the background concentration, the foreground concentration, and the boundary concentration are associated in advance with the RGB values that are color values.

At the section of the pattern kind of the pattern selection table PT, as described above, the kinds of hatch patterns corresponding to the color values are designated from the plurality of kinds of hatch patterns such as the vertical line, the horizontal line, the grid line, the oblique line, and the oblique grid line. At the section of the background concentration, the value of the background concentration corresponding to the color value is designated. At the section of the foreground concentration, the value of the foreground concentration corresponding to the color value is designated. At the section of the boundary concentration, the value of the boundary concentration corresponding to the color value is designated.

By the pattern selection table PT, the hatch patterns of the hatch shapes corresponding to the RGB values of the color image, the background concentration, the foreground concentration, and the boundary concentration are determined. Specifically, when the color image data is converted into the monochromatic image data, the pattern kind determining unit 41 selects the hatch pattern of the hatch shape designated at the section of the pattern kind of the pattern selection table PT in the image area of the color image data with reference to the pattern selection table PT. The pattern concentration determining unit 42 determines the background concentration of the hatch pattern as the concentration designated at the section of the background concentration of the pattern selection table PT, and determines the foreground concentration of the hatch pattern as the foreground concentration designated at the section of the foreground concentration of the pattern selection table PT, with reference to the pattern selection table PT. The pattern concentration determining unit 42 determines the boundary concentration of the boundary area of the hatch pattern, as the boundary concentration designated at the section of the boundary concentration of the pattern selection table PT.

In the pattern image database PDB, the image data of the hatch pattern is stored in advance for each pattern kind such as the vertical line, the horizontal line, the grid line, the oblique line, and the oblique grid line. The hatch pattern is an image with a predetermined size of, for example, 32×32 pixels or the like, and includes at least information representing the background area and the foreground area in the image area of the hatch pattern. Accordingly, as will be described later, when the hatch pattern is applied to the image area, the pattern concentration determining unit 42 can determine whether or not the target pixel (for example, one pixel) in the image area corresponds to any one of the background area and the pattern area, with reference to the pattern image database PDB.

When the target pixel is in the background area and within a predetermined number of pixels from the boundary of the pattern area, the pattern concentration determining unit 42 determines that the area corresponds to the boundary area. The predetermined number of pixels may be one pixel which is fixed, and may be determined according to resolution of printing. For example, in 600 dpi (dot per inch), one pixel may be the boundary area. In 1200 dpi, two pixels may be the boundary area.

Figure 15:
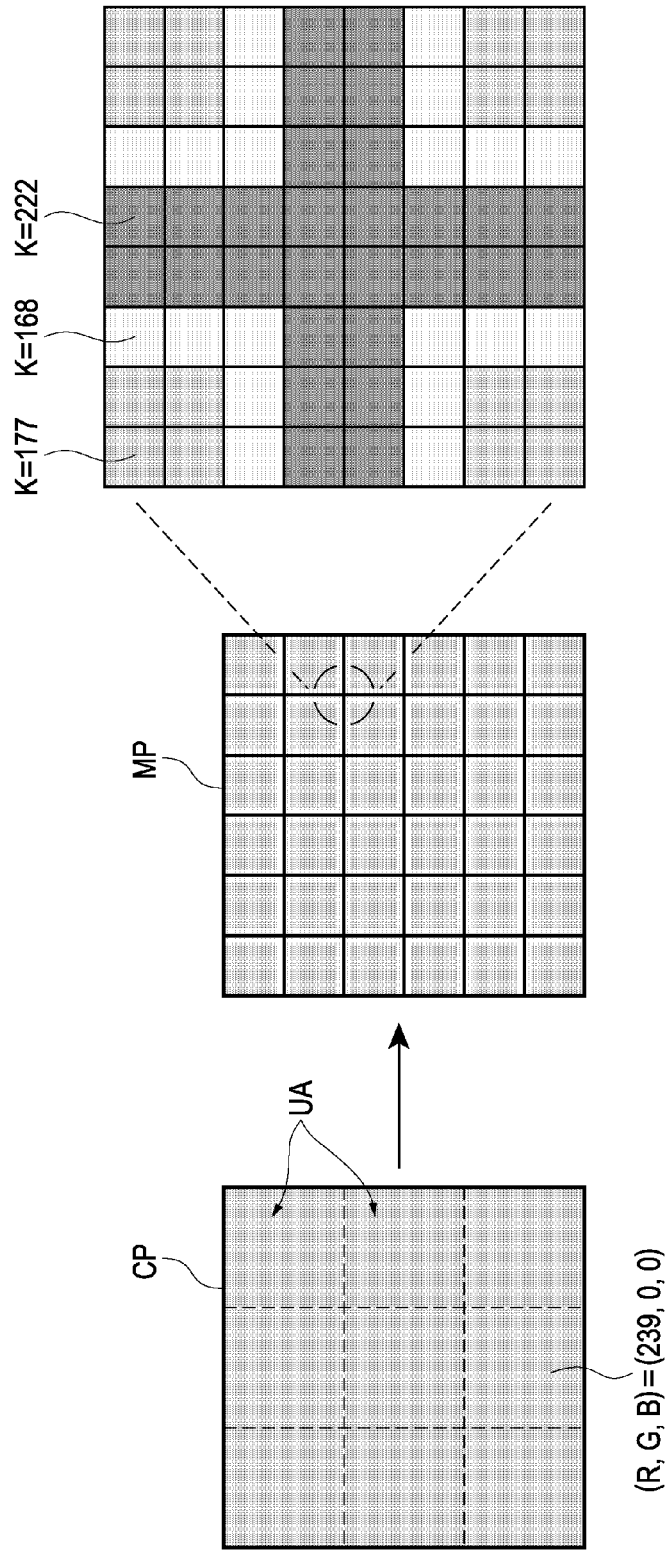
FIG. 15 is a diagram illustrating an example of a hatch pattern.

Next, an outline of a process using the pattern selection table PT and the pattern image database PDB will be described with reference to FIG. 15 illustrating an example of the hatch pattern. Herein, in the whole image area, a color image CP having a color value of (R, G, B)=(239, 0, 0) will be described as an example.

As shown in FIG. 15, the hatch pattern may be assigned to each unit area UA formed by partitioning the image area of the color image CP by the same sizes as that of the hatch pattern. The kind of the hatch pattern assigned to the unit area UA may be determined according to the pattern selection table PT. According to the pattern selection table PT shown in FIG. 20, the pattern kind corresponding to the RGB value of the color image, that is, the color value of a color angle equal to or more than 0° and less than 30° in (R, G, B)=(239, 0, 0) is the "grid", and the hatch pattern P1 (FIG. 16) of the grid line is applied to the color image CP. Accordingly, as shown in FIG. 15, the hatch pattern P1 of the grid line registered in the pattern image database PDB is applied for each unit area UA to the monochromatic image MP formed by converting the color image CP.

According to the pattern selection table PT shown in FIG. 14, the background concentration corresponding to (R, G, B)=(239, 0, 0) is K=177, the foreground concentration is K=222, and the boundary concentration is K=168. Accordingly, the background concentration of the monochromatic image MP is K=177, and the foreground concentration is K=222. The boundary concentration of one pixel that is the boundary between the background area and the pattern area is K=168.

Accordingly, in one grid line pattern, the pattern area representing the grid line is the darkest, the boundary area of one pixel adjacent to the edge of the grid line is the brightest, and the background area is intermediately bright. Accordingly, a person who sees the monochromatic image MP has an illusion by the existence of the boundary area, feels that the grid line is darker, and sees that the grid line pattern is high contrast. When the monochromatic image MP is printed by the printer 20, the boundary area is brighter than other two areas, and thus it is possible to reduce the amount of toner necessary for the printing of the boundary area.

As described above, the hatch pattern P1 of the grid line determined by the pattern selection table PT and the pattern image database PDB is applied to each unit area UA on the whole face of the color image CP. In the fourth embodiment, the foreground concentration (K=222) higher than the background concentration is determined to be smaller than the case where there is no boundary area (for example, K=232) to be viewed as substantially the same contrast as that of the case where there is no boundary area. Accordingly, when the monochromatic image MP is printed by the printer 20, the amount of toner necessary for the printing of the foreground concentration is reduced.

Figure 16:
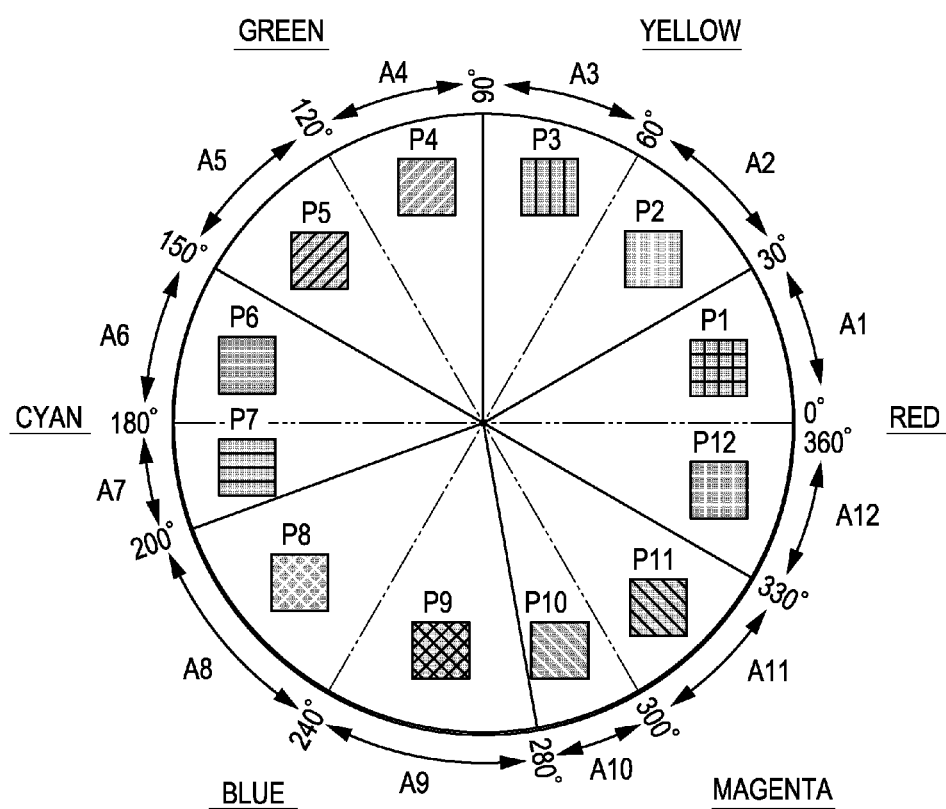
FIG. 16 is a diagram illustrating an example of correspondence between color on a color circle and hatch patterns.

In the fourth embodiment, the reference of selecting the hatch pattern from the pattern selection table PT is preset to satisfy the following requirements according to the example of the correspondence between the color tones and the hatch patterns P1 to P12 on the color circle shown in FIG. 16, but the invention is not limited thereto.

(1) Requirement for Assignment of Hatch Shape corresponding to Color Tone
(2) Requirement for Change of Background Concentration corresponding to Brightness of Color Value
(3) Requirement for Line Density of Hatch Shape corresponding to Brightness
(4) Requirement for Assignment of Hatch Shape between Colors in Complementary Relationship
(5) Requirement for Assignment of Hatch Shape between Colors of Color Areas adjacent to each other In the fourth embodiment, the foreground concentration is higher (darker) than the background concentration, but the invention is not limited thereto. That is, the invention may be applied to a case where the hatch shape of the pattern area is non-white gray and the background area of the hatch shape is higher than that of the hatch shape. In this case, a contrast effect of color occurs between the boundary area and the background area, and there is an illusion of feeling that the background area is darker.

Next, a process performed by the image processing device 100 (an image processing method and an image processing program) described above will be described with reference to the flowchart of FIG. 17.

Figure 17:
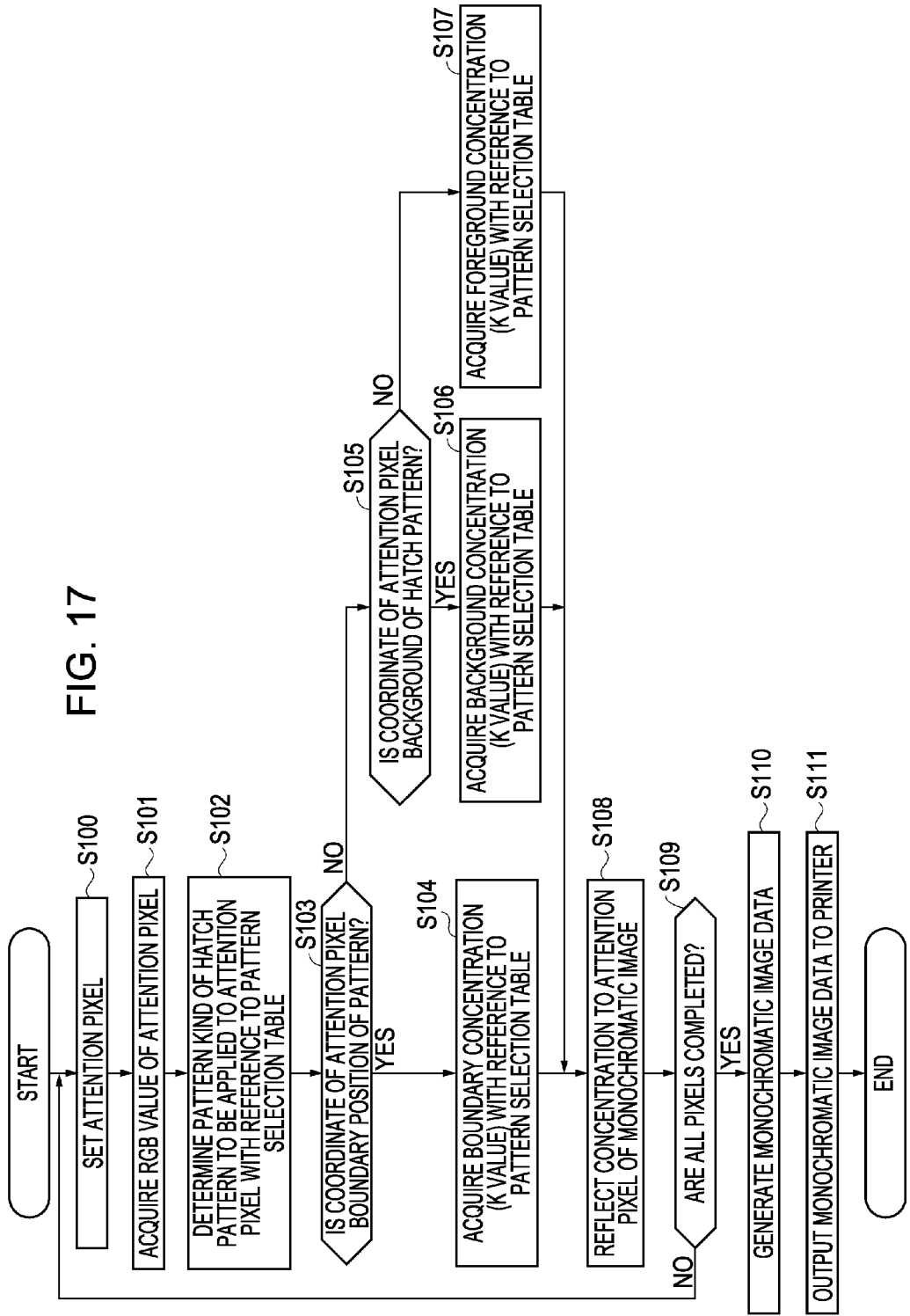
FIG. 17 is a flowchart illustrating flow of a process performed by an image processing device.

For example, when the printer driver 40 receives a printing instruction of monochromatic printing of the color image data from the application 30, a process shown in FIG. 17 is started. When the process is started, the pattern determining unit 41 sets a target pixel in the image area of the color image data (Step S100), and acquires RGB value of the target pixel from the color image data (Step S101). The pattern determining unit 41 determines the pattern kind corresponding to the acquired RGB value with reference to the pattern selection table PT (Step S102).

Then, the pattern concentration determining unit 42 determines whether or not the coordinate of the target pixel is the boundary position of the hatch pattern (Step S103).

As described above, the hatch pattern is assigned to the unit area UA with a predetermined size in the image area of the color image. Accordingly, herein, it is determined whether the target pixel is at the position corresponding to the background or is at the position corresponding to the foreground in the hatch pattern assigned to each unit area UA. Specifically, when the coordinate of the target pixel is (a, b) and the size of the hatch pattern is N×N pixels, the relative coordinate (x, y) of the target pixel in the hatch pattern is acquired by the following formulas (2) and (3). In the following formulas, "mod" is an operator of returning a remainder of division. The pattern concentration determining unit 42 determines whether the relative coordinate (x, y) corresponds to the background or the foreground in the hatch pattern with reference to the image data of the hatch pattern registered in the pattern image database PDB.

$$x = a \bmod N \quad (2)$$

$$y = b \bmod N \quad (3)$$

Herein, the relative coordinate (x, y) of the target pixel is the background in the hatch pattern, a distance from the foreground is calculated, and it is determined whether or not the attention is at the boundary position of the hatch pattern.

As a result of the determination, when the target pixel is at the boundary position (Step S103: Yes), the pattern concentration determining unit 42 acquires the K value of the boundary concentration corresponding to the RGB value of the target pixel with reference to the pattern selection table PT (Step S104) (concentration determining process and concentration determining function), and the process proceeds to Step S108.

Meanwhile, when the target pixel is not at the boundary position (Step S103: No), the pattern concentration determining unit 42 determines whether or not the target pixel is the background of the hatch pattern (Step S105). Herein, the determination result of Step S103 may be used.

When the target pixel corresponds to the background (Step S105: Yes), the pattern concentration determining unit 42 acquires the K value of the background concentration corresponding to the RGB value of the target pixel with reference to the pattern selection table PT (Step S106), and the process proceeds to Step S108.

Meanwhile, when the target pixel corresponds to the pattern area (Step S105: No), the pattern concentration determining unit 42 acquires the K value of the foreground concentration corresponding to the RGB value of the target pixel with reference to the pattern selection table PT (Step S107), and the process proceeds to Step S108.

In Step S108, the monochromatic image data generating unit 43 applies the K value of the acquired concentration to the pixel corresponding to the target pixel in the image area of the monochromatic image. Accordingly, the pixel corresponding to the target pixel in the monochromatic image has the K value of the concentration corresponding to the hatch pattern of the kind determined in Step S102.

Then, the monochromatic image data generating unit 43 determines whether or not the process of Step S100 to S108 is performed for all the pixels of the color image (Step S109). When the process is not completed for all the pixels (Step S109: No), the process returns to Step S100. For example, the monochromatic image data generating unit 43 scans the target pixel in a raster direction to set a new target pixel, and the process since Step S101 is performed on the new target pixel.

Meanwhile, when the process is completed for all the pixels (Step S109: Yes), all the pixels of the monochromatic image have the K value of the concentration corresponding to the hatch pattern of the kind determined in Step S102, and the monochromatic image data generating unit 43 generates monochromatic image data of the monochromatic image (Step S110). The generated monochromatic image data is output as job data to the printer 20 by the printer driver 40 (Step S111). As a result, according to the job data, as the monochromatic printing of the color image data transmitted from the application 30, the printer 20 prints the hatched monochromatic image corresponding to the color of the color image.

According to the fourth embodiment described above, there are the following advantages.

(1) When the monochromatic image data formed by transferring to the monochromatic hatch pattern corresponding to the color tone of the color image is generated from the color image data, the boundary area is added to the boundary between the pattern area and the background area of the hatch pattern, the brightness of the boundary area is set to be brighter than any of the pattern area and the background area, and thus it is possible to reduce the amount of used toner of the boundary area. A person who sees the monochromatic image can view that the contrast of the hatch pattern is higher than the case where there is no boundary area.

(2) Even when any higher concentration of the pattern area and the background area is made lower, it is possible to obtain the contrast similar to the case where there is no boundary area, and thus it is possible to further reduce the amount of toner necessary for printing.

(3) The values of the foreground concentration, the background concentration, and the boundary concentration of the hatch patterns are regulated in the table for each hatch pattern determined by the color tone, and the concentration is determined with reference thereto. Accordingly, as compared with the case of calculating each concentration, the time necessary to determine the concentration is at a high speed, and thus it is possible to shorten the time necessary for the printing.

Fifth Embodiment

Figure 18:
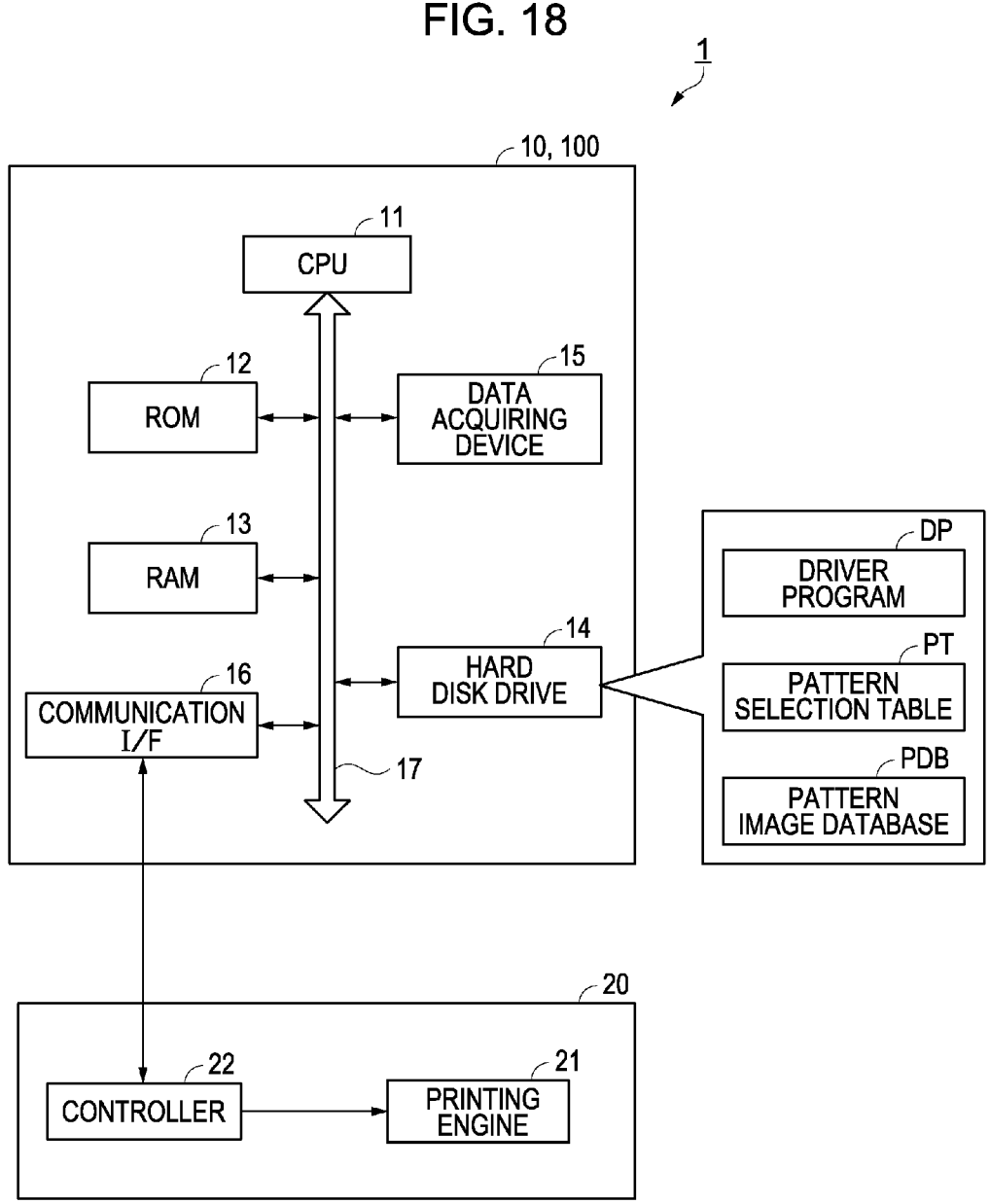
FIG. 18 is a diagram illustrating a schematic configuration of a printing system according to a fifth embodiment.

FIG. 18 is a diagram illustrating a schematic configuration of a printing system 1 according to the fifth embodiment. As shown in FIG. 18, the printing system 1 includes a host computer 10 and a printer 20, and the host computer 10 and the printer 20 are connected to each other to perform data communication.

The printer 20 includes a printing engine 21 that performs printing on a medium such as a sheet, and a controller 22 that controls an operation or the like of the printing engine 21. The printer 20 performs a process of receiving printing job data from the host computer 10, and a process of causing the printing engine 21 to perform printing according to the printing job by a control of the controller 22. In the fifth embodiment, it is assumed that the printer 20 is a laser printer which attaches toner to a photoreceptor using laser light, and transfers it to paper by heat and pressure to perform printing.

The host computer 10 is a general-purpose personal computer in which a printer driver 40 (FIG. 19) corresponding to the printer 20 is installed in advance, and is a host device of the printer 20 that transmits a printing job to the printer 20. The host computer 10 includes, as hardware, a CPU (Central Processing Unit) 11, a ROM (Read Only Memory) 12, a RAM (Random Access Memory) 13, a hard disk drive 14, a data acquiring device 15, and a communication I/F 16. The host computer 10 with such a configuration is connected to a bus 17 to perform data communication through the bus 17.

The CPU 11 is a control device that controls each configuration of the host computer 10. The ROM 12 is a nonvolatile memory in which a predetermined program for controlling the host computer 10 is recorded, and the RAM 13 is a general-purpose memory used as a working memory or the like.

The data acquiring device 15 acquires a driver program DP of the printer 20, data such as a pattern selection table PT and a pattern image database PDB to be described later through reading of a recording medium such as a CD-ROM or network communication with an external server.

A driver program DP acquired by the data acquiring device 15, a pattern selection table PT, and a pattern image database PDB are stored in the hard disk drive 14.

The communication I/F 16 is an interface portion connected to the printer 20 by a cable or a radio communication. The communication between the printer 20 and the host computer 10 is performed through the communication I/F 16.

The CPU 11 of the host computer 10 installs the data of the driver program DP stored in the hard disk drive 14, and controls the host computer 10 to serve as the image processing device 100. Hereinafter, the image processing device 100 will be described.

Figure 19:
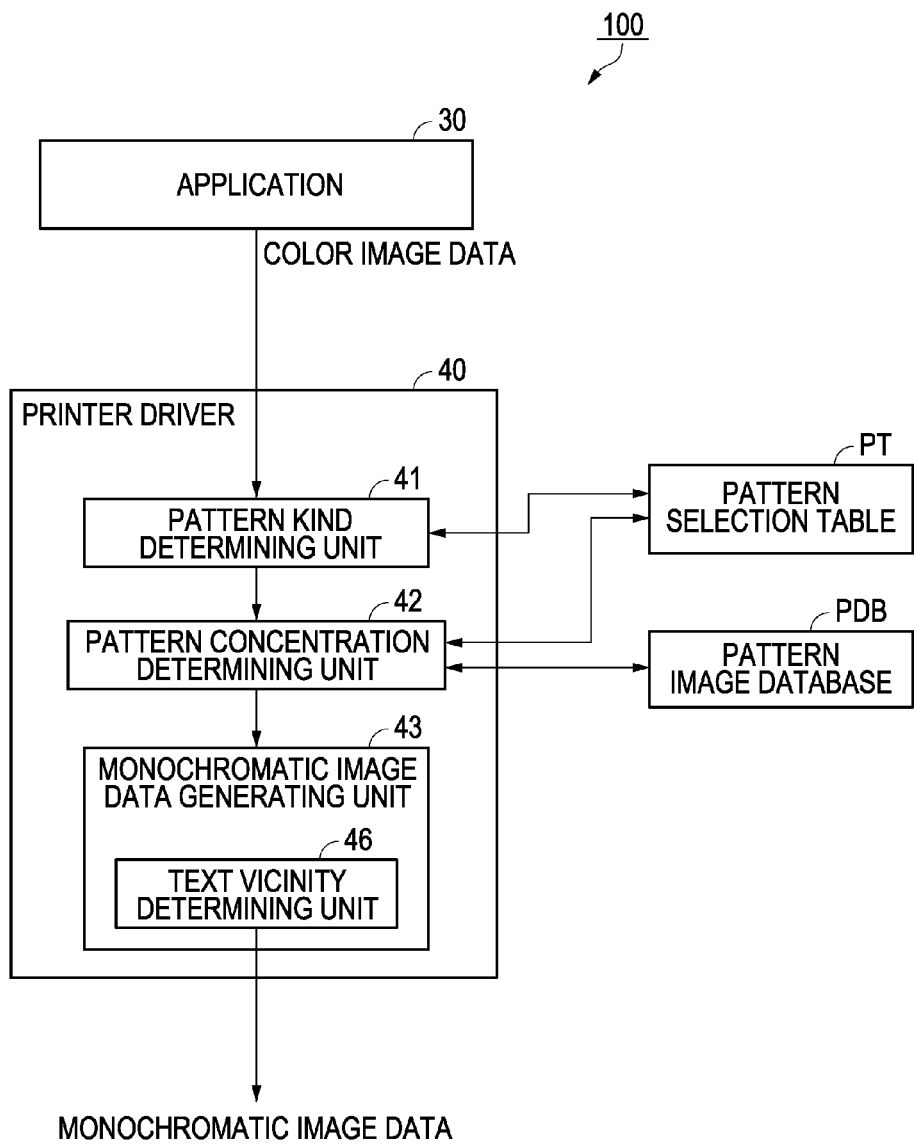
FIG. 19 is a diagram illustrating a configuration of software of an image processing device.

FIG. 19 is a diagram illustrating a configuration of software of the image processing device 100. As shown in FIG. 19, the image processing device 100 has an application 30, and a printer driver 40.

The application 30 is software that is the source of a printing request for the printer 20, such as word processing software or a web browser. The application 30 generates color image data as a printing request and a printing target, and transmits the color image data to the printer driver 40.

In the fifth embodiment, the application 30 performs a printing process by a graphic device interface (GDI) of an operating system (OS) that is software for controlling a basic operation of the host computer 10. Accordingly, the GDI transmits a drawing command to the printer driver 40, and the printer driver 40 acquires the printing requirement and the color image data as a printing target, but the invention is not limited thereto.

The printer driver 40 is software for controlling the printing of the printer 20. The printer driver 40 generates printing data in a data form which can be processed by the printer 20 from the printing request received from the application 30 and the image data, and transmits the printing data to the printer 20 through the communication I/F 16. Accordingly, the printer driver 40 causes the printer 20 to perform the printing.

The printer driver 40 of the fifth embodiment has a function of causing the printer 20 to print the monochromatic image in which color image data is converted into hatched monochromatic image (single-color image) data such that the color difference in the original color image is distinguishable by the shape of the hatching. When the text image is included in the color image, the text image is converted into the monochromatic image, the concentration of which is not changed, and is disposed above the hatch shape. Accordingly, the part of the hatch shape in the monochromatic image superposed by the text image is hidden.

To realize the hatched monochromatic printing function, the printer driver 40 includes a pattern determining unit 41, a pattern concentration determining unit 42, and a monochromatic image data generating unit 43. Such a function is realized in cooperation of the hardware described above and the software such as the driver program DP.

The pattern determining unit 41 performs a process of determining the hatch pattern (the first hatch pattern) applied to the image area of the color image data, according to the color, particularly, the color tone of the color image of the color image data. In the fifth embodiment, a plurality of kinds of hatch patterns (monochromatic patterns) representing hatch shapes such as a vertical line, a horizontal line, a grid line, an oblique line, and an oblique grid line by a monochromatic concentration are used. The pattern determining unit 41 selects the hatch pattern of the hatch shape applied to the color image CP from the plurality of kinds of hatch patterns with reference to the pattern selection table PT.

The pattern concentration determining unit 42 performs a process of determining the concentration of the hatch pattern according to the color of the color image of the color image data, particularly, the brightness. The hatch pattern of the fifth embodiment includes a background area that is a background of the hatch shape, and a pattern area of the hatch shape that is drawn to overlap with the background area and is a foreground for the background.

In the fifth embodiment, the pattern concentration determining unit 42 determines the concentration of each area with reference to the pattern selection table PT and the pattern image database PDB. That is, as shown in FIG. 20 illustrating an example of the pattern selection table PT, the pattern selection table PT includes a monochromatic concentration in the background area (hereinafter, referred to as "background concentration"), and a monochromatic concentration in the pattern area (hereinafter, referred to as "foreground concentration").

The monochromatic image data generating unit 43 has the hatch shape determined by the pattern determining unit 41, and applies the hatch pattern having the concentration determined by the pattern concentration determining unit 42 to the image area of the color image CP, to generate the monochromatic image data formed by transferring the color of the color image CP to the hatch shape.

The monochromatic image data generating unit 43 includes a text vicinity determining unit 46. The text vicinity determining unit 46 has a function of determining whether or not the attention area is the vicinity on the basis of the distance from the text image superposed on the pattern area. When the text vicinity determining unit 46 determines that the attention area is the vicinity, the monochromatic image data generating unit 43 does not apply the hatch pattern to the attention area (the first area). In the fifth embodiment, the monochromatic image based on black is assumed as the monochromatic image, but the invention is not limited thereto. An image based on red or blue may be assumed.

Next, a method of converting the color image data into the hatched monochromatic image data will be described. First, the pattern selection table PT and the pattern image database PDB will be described. In the following description, the color image data has RGB values representing colors of R (red), G (green), and B (blue) by 8-bit gradation values "0 to 255" for each pixel of the color image. The monochromatic image data has a K value representing a color of K (black) by 8-bit gradation values "0 to 255", that is, a concentration of a K monochromatic color, for each pixel of the monochromatic image. In the RGB values of the color image data, (R, G, B)=(255, 255, 255) corresponds to white, and (R, G, B)=(0, 0, 0) corresponds to black. In the K value, K=255 corresponds to black, and K=0 corresponds to white.

As shown in FIG. 20, in the pattern selection table PT, the pattern kind, the foreground concentration, and the background concentration are associated in advance with the RGB values that are color values.

At the section of the pattern kind of the pattern selection table PT, as described above, the kinds of hatch patterns corresponding to the color values are designated from the plurality of kinds of hatch patterns such as the vertical line, the horizontal line, the grid line, the oblique line, and the oblique grid line. At the section of the foreground concentration, the value of the foreground concentration corresponding to the color value is designated. At the section of the background concentration, the value of the background concentration corresponding to the color value is designated.

By the pattern selection table PT, the hatch patterns of the hatch shapes corresponding to the RGB values of the color image CP, the background concentration, and the foreground concentration are determined. Specifically, when the color image data is converted into the monochromatic image data, the pattern kind determining unit 41 selects the hatch pattern of the hatch shape designated at the section of the pattern kind of the pattern selection table PT in the image area of the color image data with reference to the pattern selection table PT. The pattern concentration determining unit 42 determines the background concentration of the hatch pattern as the foreground concentration designated at the section of the background concentration of the pattern selection table PT, and determines the foreground concentration of the hatch pattern as the concentration designated at the section of the foreground concentration of the pattern selection table PT, with reference to the pattern selection table PT.

In the pattern image database PDB, the image data of the hatch pattern is stored in advance for each pattern kind such as the vertical line, the horizontal line, the grid line, the oblique line, and the oblique grid line. The hatch pattern is an image with a predetermined size of, for example, 32×32 pixels or the like, and includes at least information representing the background area and the foreground area in the image area of the hatch pattern. Accordingly, as will be described later, when the hatch pattern is applied to the image area, the pattern concentration determining unit 42 can determine whether or not the target pixel (for example, one pixel) in the image area corresponds to any one of the background area and the pattern area, with reference to the pattern image database PDB.

Figure 21:
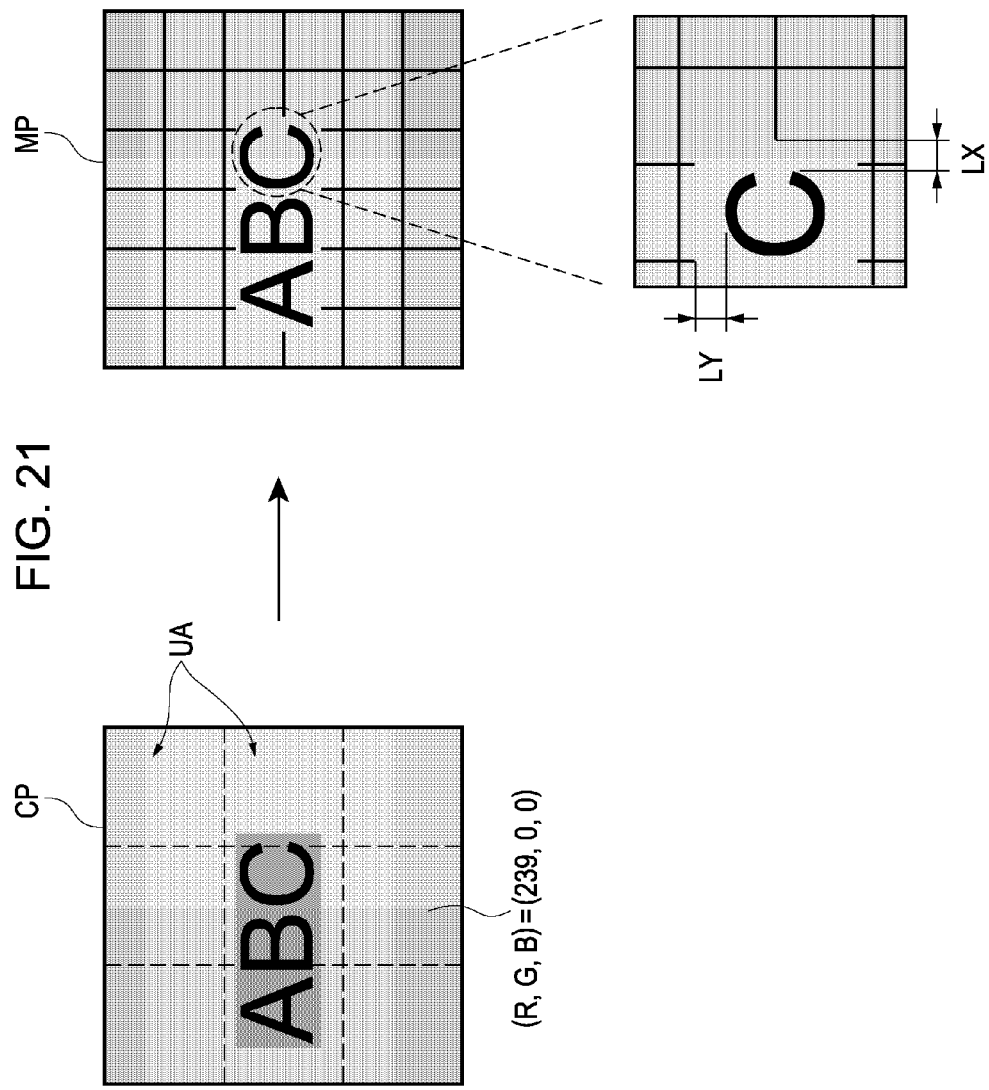
FIG. 21 is a diagram illustrating an example of assignment of a hatch pattern.

Next, an outline of a process using the pattern selection table PT and the pattern image database PDB will be described with reference to FIG. 21 illustrating an example of the hatch pattern. Herein, in the whole image area, a color image CP having a color value of a color angle equal to or more than 0° and less than 30° in (R, G, B)=(239, 0, 0), in which a black text image "ABC" are disposed substantially at the center of the image, will be described as an example.

As shown in FIG. 21, the hatch pattern may be assigned to each unit area UA formed by partitioning the image area of the color image CP by the same sizes as that of the hatch pattern. The kind of the hatch pattern assigned to the unit area UA may be determined according to the pattern selection table PT. According to the pattern selection table PT shown in FIG. 14, the pattern kind corresponding to the RGB value of the color image, that is, the color value of (R, G, B)=(239, 0, 0) is the "grid", and the hatch pattern P1 (FIG. 22) of the grid line is applied to the color image CP. The hatch pattern P1 may be a vector image or a bitmap image.

In the pattern selection table PT shown in FIG. 20, the foreground concentration corresponding to (R, G, B)=(239, 0, 0) is K=232, and the background concentration is regulated as K=177. Accordingly, the pattern concentration determining unit 42 determines that the foreground concentration of the monochromatic image MP is K=232 and the background concentration is K=177.

As described above, the hatch pattern P of the grid line determined by the pattern selection table PT and the pattern image database PDB is applied to each unit area UA on the whole face of the color image CP, and the monochromatic image MP in which the hatch pattern P of the grid line is the graphic image is generated.

In this case, the text vicinity determining unit 46 calculates a distance from the text image and compares the distance with a predetermined distance to determine whether or not it is the vicinity. The monochromatic image data generating unit 43 determines that an area (first area) regulated within a predetermined distance from the text image is the vicinity, and excludes the application of the hatch pattern.

More specifically, when it is in the vicinity of the text image, the monochromatic image data generating unit 43 assigns the vicinity concentration corresponding to the vicinity area instead of the foreground concentration of the hatch pattern. The vicinity concentration may be fixed to a predetermined gray concentration, and may be regulated in the pattern selection table PT. The printer driver 40 may determine the vicinity concentration on the basis of the concentration of the text image, the background concentration, the foreground concentration, and the like.

In the fifth embodiment, as shown in FIG. 21, on the basis of a predetermined distance (LX) from the end portion of the text included in the text image in the horizontal direction and a predetermined distance (LY) in the vertical direction, the inside of a rectangular area regulated by each predetermined distance corresponds to the vicinity. For example, in a case of "ABC", the end portion on the left side corresponds to the left end position of "A". The end portion on the right side corresponds to the right end position of "C". Since the upper and lower end portions are common in "ABC", the end portions correspond to the end position of any of the text.

In the fifth embodiment, the monochromatic image data generating unit 43 performs assignment such that all the pixels except for line drawing pixels of the text in the regulated rectangle are the vicinity concentration. In this case, the vicinity concentration is the same as the background concentration. Although the predetermined distance is preset, the predetermined distance may be set for each direction such as the vertical direction and the horizontal direction, and may be set to a constant value irrespective of the directions.

The vicinity of the text image is not limited to the regulation of the rectangle, and the vicinity area may be regulated for each line drawing pixel according to the line drawing curve of each text.

Figure 22:
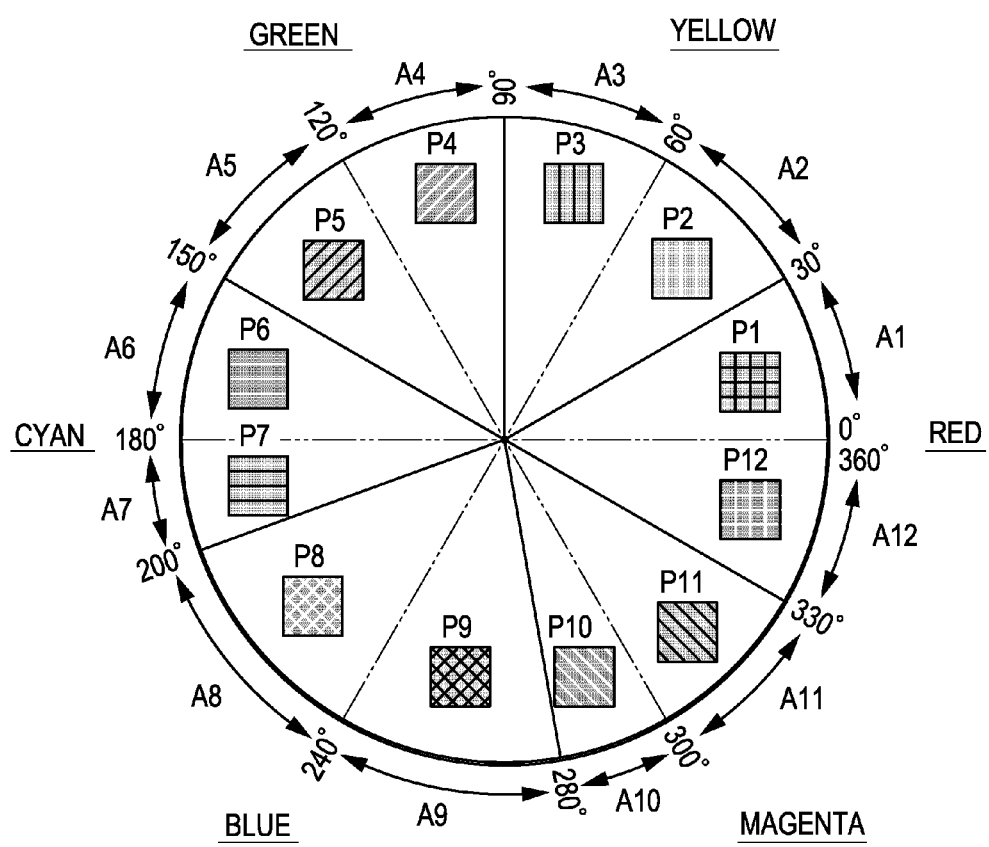
FIG. 22 is a diagram illustrating an example of correspondence between colors on a color circle and hatch patterns.

In the fifth embodiment, the reference of selecting the hatch pattern from the pattern selection table PT is preset to satisfy the following requirements according to the examples of the correspondence between the hatch patterns P1 to P12 shown in FIG. 22 illustrating the example of the correspondence between the color tones and the hatch patterns on the color circle, but the invention is not limited thereto.

Figure 23:
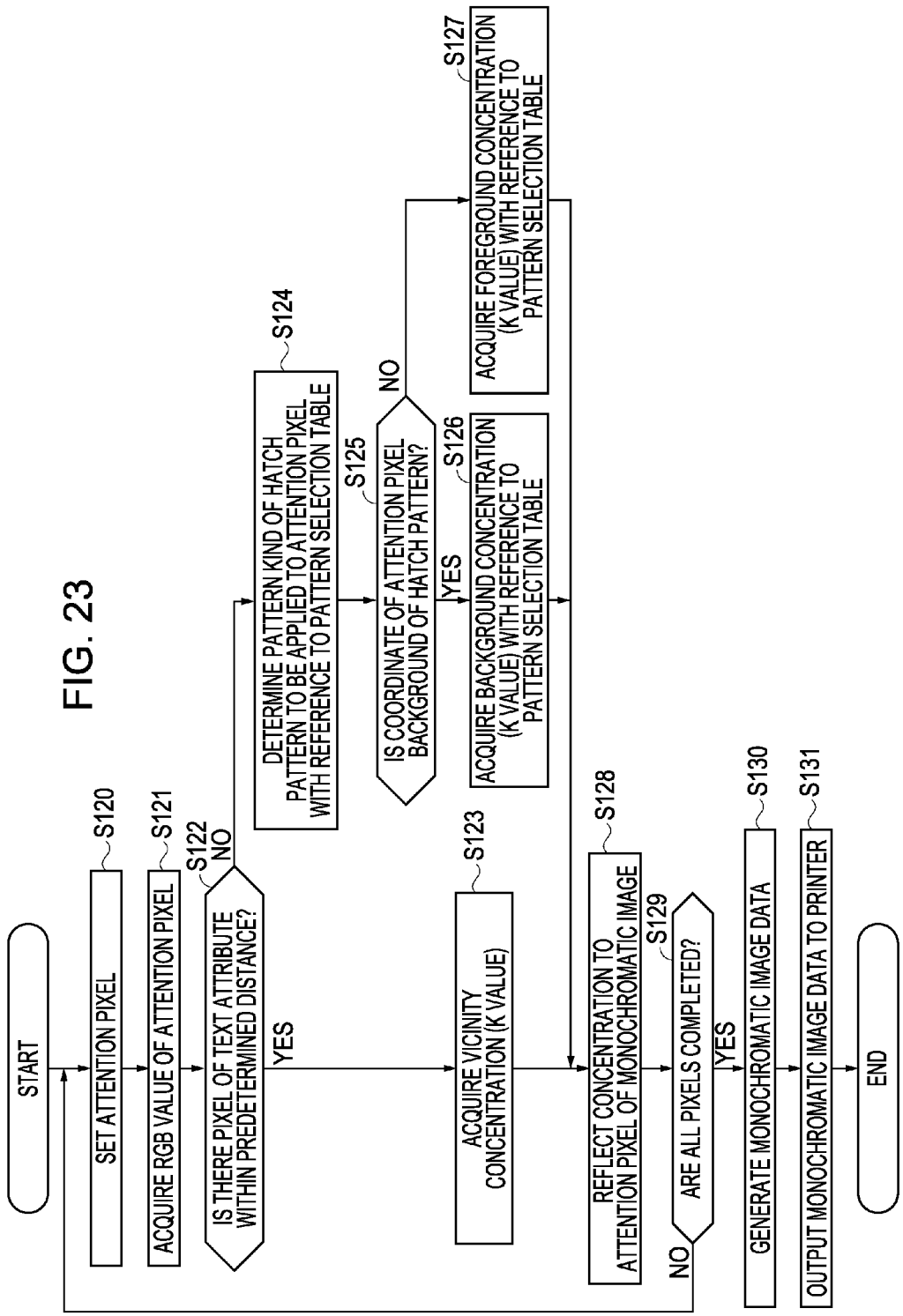
FIG. 23 is a flowchart illustrating flow of a process performed by an image processing device.

(1) Requirement for Assignment of Hatch Shape corresponding to Color Tone
   (2) Requirement for Change of Background Concentration corresponding to Brightness of Color Value
   (3) Requirement for Line Density of Hatch Shape corresponding to Brightness
   (4) Requirement for Assignment of Hatch Shape between Colors in Complementary Relationship
   (5) Requirement for Assignment of Hatch Shape between Colors of Color Areas adjacent to each other Next, a process performed by the image processing device 100 described above (an image processing method and an image processing program) will be described with reference to the flowchart of FIG. 23.

For example, when the printer driver 40 receives a printing instruction of monochromatic printing of the color image data from the application 30, a process shown in FIG. 23 is started. When the process is started, the pattern determining unit 41 sets a target pixel in the image area of the color image data (Step S120), and acquires RGB value of the target pixel from the color image data (Step S121).

The text vicinity determining unit 46 determines whether or not there is a pixel having the text attribute within a predetermined distance from the target pixel (Step S122).

When it is determined that there is the pixel having the text attribute within the predetermined distance (Step S122: Yes), the vicinity concentration is acquired (Step S123), and the process proceeds to Step S128.

Meanwhile, when it is determined that there is no pixel having the text attribute within the predetermined distance (Step S122: No), the pattern determining unit 41 determines the pattern kind corresponding to the acquired RGB value with reference to the pattern selection table PT (Step S124).

Then, the pattern concentration determining unit 42 determines whether or not the coordinate of the target pixel is the background position of the hatch pattern (Step S125).

As described above, the hatch pattern is assigned to the unit area UA with a predetermined size in the image area of the color image CP. Accordingly, herein, it is determined whether the target pixel is at the position corresponding to the background or is at the position corresponding to the foreground in the hatch pattern assigned to each unit area UA. Specifically, when the coordinate of the target pixel (a, b) is and the size of the hatch pattern is N×N pixels, the relative coordinate of the target pixel (x, y) is acquired by the following formulas (2) and (3). In the following formulas, "mod" is an operator of returning a remainder of division. The pattern concentration determining unit 42 determines whether the relative coordinate (x, y) corresponds to the background or the foreground in the hatch pattern with reference to the image data of the hatch pattern registered in the pattern image database PDB.

$$x = a \bmod N \qquad (2)$$

$$y = b \bmod N \qquad (3)$$

As a result of the determination, when the target pixel is the background of the hatch pattern (Step S125: Yes), the K value of the background concentration is acquired (Step S126), and the process proceeds to Step S128.

Meanwhile, when the target pixel is not the background of the hatch pattern (Step S125: No), the K value of the foreground concentration is acquired (Step S127), and the process proceeds to Step S128.

In Step S128, the K value of the acquired concentration is applied to the pixel corresponding to the target pixel in the image area of the monochromatic image.

Then, it is determined whether or not the process of Step S120 to S128 is performed for all the pixels of the color image CP (Step S129). When the process is not completed for all the pixels (Step S129: No), the process returns to Step S120. For example, the pattern kind determining unit 41 scans the target pixel in a raster direction to set a new target pixel, and the process since Step S121 is performed on the new target pixel.

Meanwhile, when the process is completed for all the pixels (Step S129: Yes), all the pixels of the monochromatic image have the K value of the concentration corresponding to the hatch pattern of the kind determined in Step S130, and the monochromatic image data generating unit 43 generates monochromatic image data of the monochromatic image (Step S130). The generated monochromatic image data is output as printing job data to the printer 20 by the printer driver 40 (Step S131). As a result, as the monochromatic printing of the color image data transmitted from the application 30, the printer 20 prints the hatched monochromatic image corresponding to the color of the color image.

According to the fifth embodiment described above, there are the following advantages.

(1) When the monochromatic image data formed by transferring to the monochromatic hatch pattern corresponding to the color tone of the color image is generated from the color image data, the pattern area of the hatch pattern is not disposed in the vicinity of the text image. Accordingly, the intersection between the line drawing of the text image and the line drawing of the pattern area is avoided, the text image is easily read, and thus the person who sees the monochromatic image can clearly recognize the text image.

Figure 24:
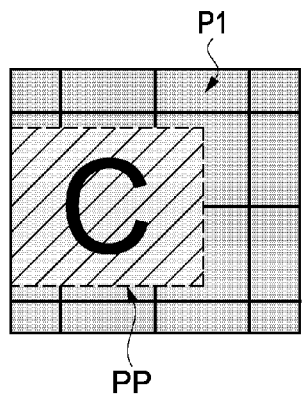
FIG. 24 is a diagram illustrating an example of a second hatch pattern.

The fifth embodiment of the invention has been described with reference to the drawings, but the specific configuration is not limited to the fifth embodiment, and the embodiment includes change in design within the scope which does not deviate from the main concept of the invention. For example, the vicinity concentration is not limited to the same concentration as the background concentration. The vicinity concentration may be accompanied with hatch pattern information for generating the second hatch pattern PP in the rectangular area as shown in FIG. 24 illustrating an example of the second hatch pattern PP. In this case, to improve visibility of the text image, the second hatch pattern PP may have a fainter color and a lower concentration than those of the hatch pattern P1 of the grid line.

In the fifth embodiment, the second hatch pattern PP employs the hatch pattern P5 of the oblique line, but the invention is not limited thereto. The information about the concentration of the second hatch pattern PP may be regulated in the pattern selection table PT in the same manner as the hatch pattern P1 of the grid line.

Figure 25:
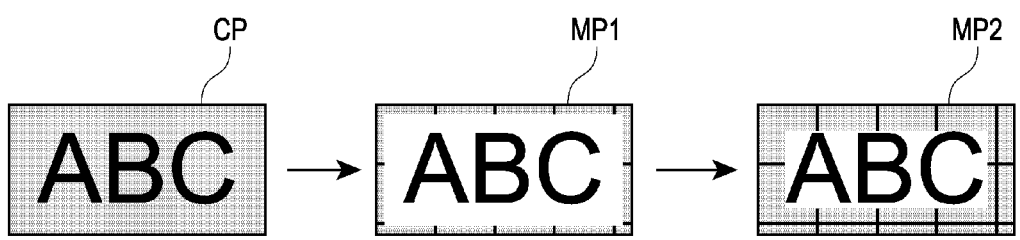
FIG. 25 is a diagram illustrating an example of change of a size of a rectangular area.

As shown in FIG. 25 illustrating an example of changing the size of the rectangular area, when the rectangular area regulated by a predetermined distance from the text image is an approximate size as compared with the image area of the first monochromatic image MP1, the printer driver 40 may change the rectangular size by decreasing the value of the predetermined distance from the text image such that the rectangular area becomes narrower. In such a case, instead of the rectangle, it may be changed to regulate the vicinity area by a unit of the line drawing pixel according to the line drawing curve of each text. As a result, the hatch pattern P1 of the grid line and the text area are disposed with good balance similarly to the second monochromatic image MP2, and it is possible to improve the visibility of the monochromatic image.

Sixth Embodiment

Figure 26:
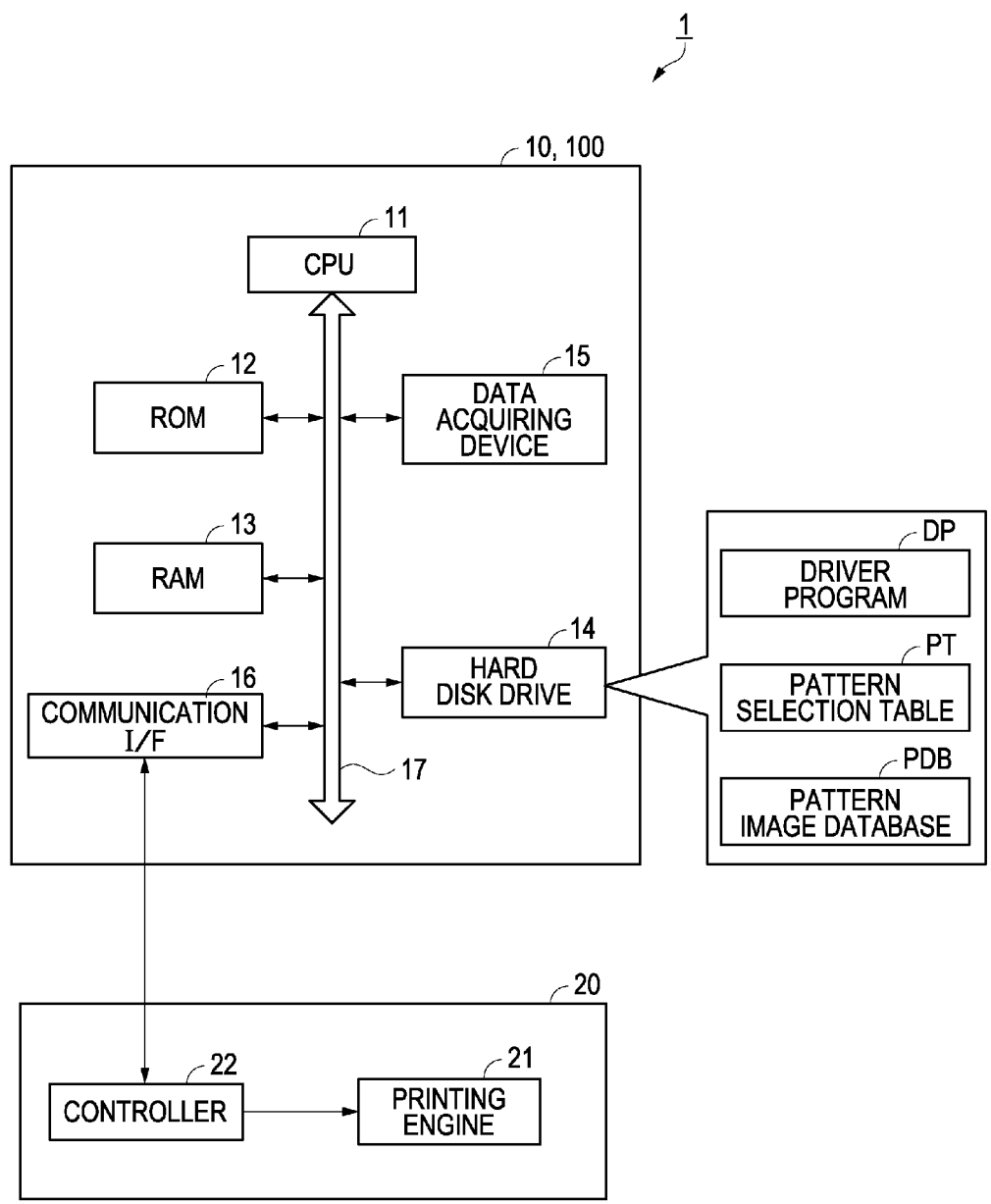
FIG. 26 is a diagram illustrating a schematic configuration of a printing system according to a sixth embodiment.

FIG. 26 is a diagram illustrating a schematic configuration of a printing system 1 according to the sixth embodiment. As shown in FIG. 26, the printing system 1 includes a host computer 10 and a printer 20, and the host computer 10 and the printer 20 are connected to each other to perform data communication.

The printer 20 includes a printing engine 21 that performs printing on a medium such as a sheet, and a controller 22 that controls an operation or the like of the printing engine 21. The printer 20 performs a process of receiving printing job data from the host computer 10, and a process of causing the printing engine 21 to perform printing according to the printing job by a control of the controller 22. In the sixth embodiment, it is assumed that the printer 20 is a laser printer which attaches toner to a photoreceptor using laser light, and transfers it to paper by heat and pressure to perform printing.

The host computer 10 is a general-purpose personal computer in which a printer driver 40 (FIG. 27) corresponding to the printer 20 is installed in advance, and is a host device of the printer 20 that transmits a printing job to the printer 20. The host computer 10 includes, as hardware, a CPU (Central Processing Unit) 11, a ROM (Read Only Memory) 12, a RAM (Random Access Memory) 13, a hard disk drive 14, a data acquiring device 15, and a communication I/F 16. The host computer 10 with such a configuration is connected to a bus 17 to perform data communication through the bus 17.

The CPU 11 is a control device that controls each configuration of the host computer 10. The ROM 12 is a nonvolatile memory in which a predetermined program for controlling the host computer 10 is recorded, and the RAM 13 is a general-purpose memory used as a working memory or the like.

The data acquiring device 15 acquires a driver program DP of the printer 20, data such as a pattern selection table PT and a pattern image database PDB to be described later through reading of a recording medium such as a CD-ROM or network communication with an external server.

A driver program DP acquired by the data acquiring device 15, a pattern selection table PT, and a pattern image database PDB are stored in the hard disk drive 14.

The communication I/F 16 is an interface portion connected to the printer 20 by a cable or a radio communication. The communication between the printer 20 and the host computer 10 is performed through the communication I/F 16.

The CPU 11 of the host computer 10 installs the data of the driver program DP stored in the hard disk drive 14, and causes the host computer 10 to serve as the image processing device 100. Hereinafter, the image processing device 100 will be described.

Figure 27:
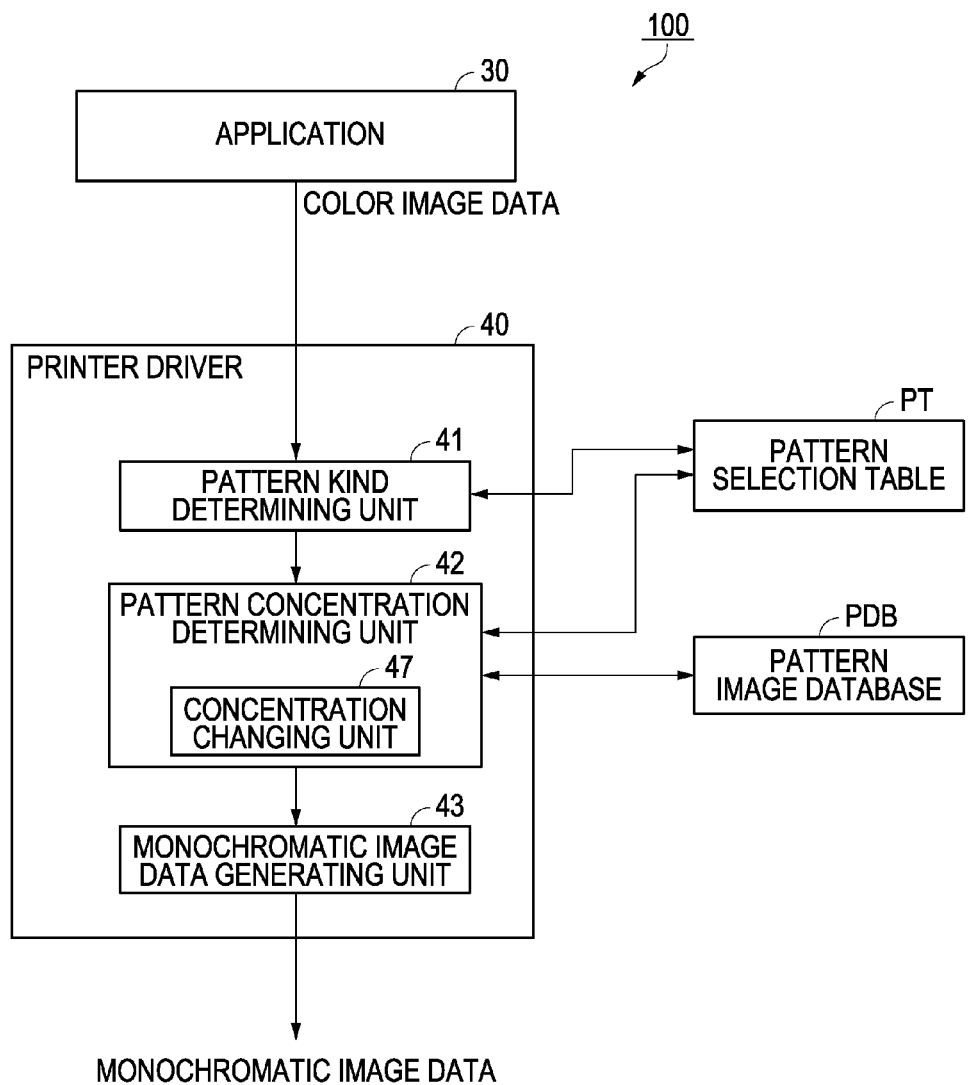
FIG. 27 is a diagram illustrating a configuration of software of an image processing device.

FIG. 27 is a diagram illustrating a configuration of software of the image processing device 100. As shown in FIG. 27, the image processing device 100 has an application 30, and a printer driver 40.

The application 30 is software that is the source of a printing request for the printer 20, such as word processing software or a web browser. The application 30 generates color image data as a printing request and a printing target, and transmits the color image data to the printer driver 40.

In the sixth embodiment, the application 30 performs a printing process by a graphic device interface (GDI) of an operating system (OS) that is software for controlling a basic operation of the host computer 10. Accordingly, the GDI transmits a drawing command to the printer driver 40, and the printer driver 40 acquires the printing requirement and the color image data as a printing target, but the invention is not limited thereto.

The printer driver 40 is software for controlling the printing of the printer 20. The printer driver 40 generates printing job data in a data form which can be processed by the printer 20 from the printing request received from the application 30 and the image data, and transmits the printing job data to the printer 20 through the communication I/F 16. Accordingly, the printer driver 40 causes the printer 20 to perform the printing.

The printer driver 40 of the sixth embodiment has a function of causing the printer 20 to print the monochromatic image in which color image data is converted into hatched monochromatic image (single-color image) data such that the color difference in the original color image is distinguishable by the shape of the hatching. When the text image is included in the color image, the text image is converted into the monochromatic image, the concentration of which is not changed, and is disposed above the hatch shape. Accordingly, a part of the hatch shape in the monochromatic image superposed with the text image is hidden.

To realize the hatched monochromatic printing function, the printer driver 40 includes a pattern determining unit 41, a pattern concentration determining unit 42, and a monochromatic image data generating unit 43. Such a function is realized in cooperation of the hardware described above and the software such as the driver program DP.

The pattern determining unit 41 performs a process of determining the hatch pattern applied to the image area of the color image data, according to the color, particularly, the color tone of the color image of the color image data. In the sixth embodiment, a plurality of kinds of hatch patterns (monochromatic pattern) representing hatch shapes such as a vertical line, a horizontal line, a grid line, an oblique line, and an oblique grid line by a monochromatic concentration are used. The pattern determining unit 41 selects the hatch pattern of the hatch shape applied to the color image CP from the plurality of kinds of hatch patterns with reference to the pattern selection table PT.

The pattern concentration determining unit 42 performs a process of determining the concentration of the hatch pattern according to the color of the color image of the color image data, particularly, the brightness. The hatch pattern of the sixth embodiment includes a background area that is a background of the hatch shape, and a pattern area of the hatch shape that is drawn to overlap with the background as a foreground for the background.

In the sixth embodiment, the pattern concentration determining unit 42 determines the concentration of each area with reference to the pattern selection table PT and the pattern image database PDB. That is, as shown in FIG. 28 illustrating an example of the pattern selection table PT, the pattern selection table PT includes a monochromatic concentration in the background area (hereinafter, referred to as "background concentration"), and a monochromatic concentration in the pattern area (hereinafter, referred to as "foreground concentration").

The pattern concentration determining unit 42 includes a concentration changing unit 47. The concentration changing unit 47 has a function of changing the concentration of the hatch pattern in the vicinity of the text image or changing the concentration of the text image according to the distance from the text image, when the text image is superposed on the hatch pattern.

The monochromatic image data generating unit 43 has the hatch shape determined by the pattern determining unit 41, and applies the hatch pattern having the concentration determined by the pattern concentration determining unit 42 to the image area of the color image CP, to generate the hatched monochromatic image data.

In the sixth embodiment, the monochromatic image based on black is assumed as the monochromatic image, but the invention is not limited thereto. An image based on red or blue may be also assumed.

Next, a method of converting the color image data into the hatched monochromatic image data will be described. First, the pattern selection table PT and the pattern image database PDB will be described. In the following description, the color image data has RGB values representing colors of R (red), G (green), and B (blue) by 8-bit gradation values "0 to 255" for each pixel of the color image. The monochromatic image data has a K value representing a color of K (black) by 8-bit gradation values "0 to 255", that is, a concentration of a K monochromatic color, for each pixel of the monochromatic image. In the RGB values of the color image data, (R, G, B)=(255, 255, 255) corresponds to white, and (R, G, B)=(0, 0, 0) corresponds to black. In the K value, K=255 corresponds to black, and K=0 corresponds to white.

As shown in FIG. 28, in the pattern selection table PT, the pattern kind, the foreground concentration, and the background concentration are associated in advance with the RGB values that are color values.

At the section of the pattern kind of the pattern selection table PT, as described above, the kinds of hatch patterns corresponding to the color values are designated from the plurality of kinds of hatch patterns such as the vertical line, the horizontal line, the grid line, the oblique line, and the oblique grid line. At the section of the foreground concentration, the value of the foreground concentration corresponding to the color value is designated. At the section of the background concentration, the value of the background concentration corresponding to the color value is designated.

By the pattern selection table PT, the hatch patterns of the hatch shapes corresponding to the RGB values of the color image CP, the background concentration, and the foreground concentration are determined. Specifically, when the color image data is converted into the monochromatic image data, the pattern kind determining unit 41 selects the hatch pattern of the hatch shape designated at the section of the pattern kind of the pattern selection table PT in the image area of the color image data with reference to the pattern selection table PT. The pattern concentration determining unit 42 determines the background concentration of the hatch pattern as the concentration designated at the section of the background concentration of the pattern selection table PT, and determines the foreground concentration of the hatch pattern as the foreground concentration designated at the section of the foreground concentration of the pattern selection table PT, with reference to the pattern selection table PT.

In the pattern image database PDB, the image data of the hatch pattern is stored in advance for each pattern kind such as the vertical line, the horizontal line, the grid line, the oblique line, and the oblique grid line. The hatch pattern is an image with a predetermined size of, for example, 32×32 pixels or the like, and includes at least information representing the background area and the foreground area in the image area of the hatch pattern.

Accordingly, as will be described later, when the hatch pattern is applied to the image area, the pattern concentration determining unit 42 can determine whether or not the target pixel (for example, one pixel) in the image area corresponds to any one of the background area and the pattern area, with reference to the pattern image database PDB.

Figure 29:
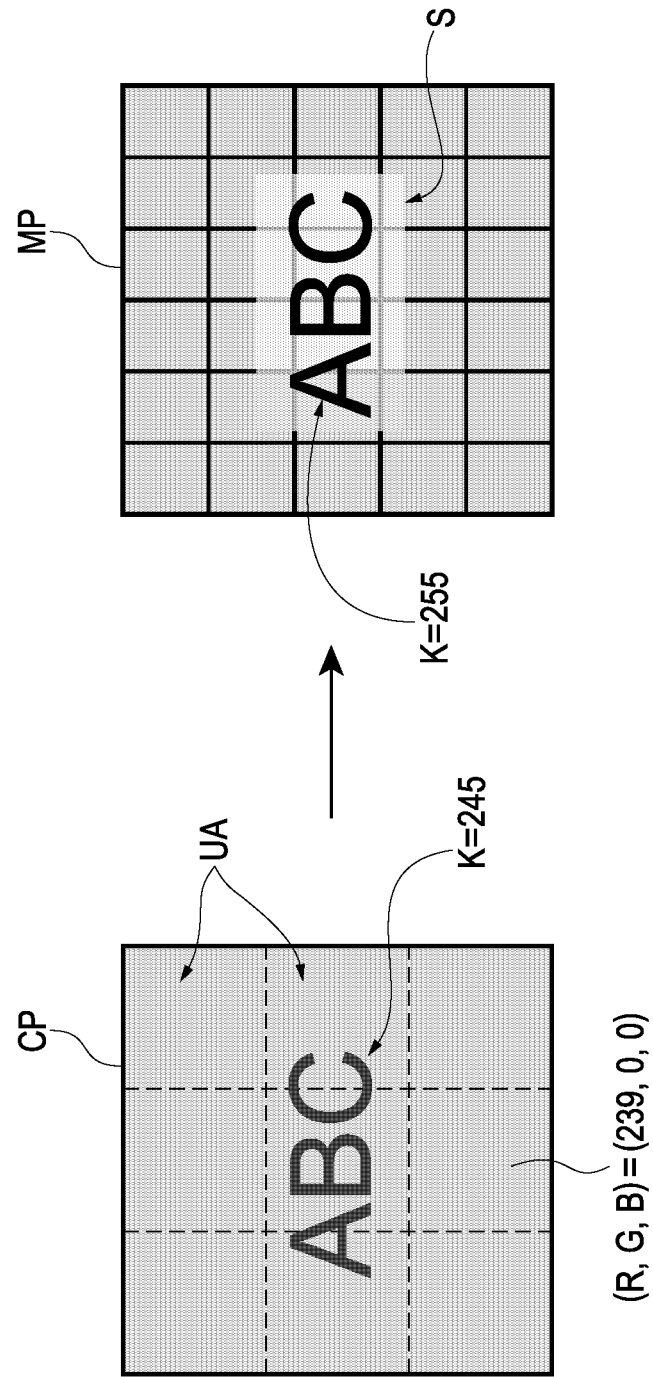
FIG. 29 is a diagram illustrating an example of assignment of a hatch pattern.

Next, an outline of a process using the pattern selection table PT and the pattern image database PDB will be described with reference to FIG. 29 illustrating an example of the hatch pattern. Herein, in the whole image area, a color image CP having a color value of a color angle equal to or more than 0° and less than 30° in (R, G, B)=(239, 0, 0), in which a text image "ABC" with a concentration of 245 are disposed substantially at the center of the image, will be described as an example.

As shown in FIG. 29, the hatch pattern may be assigned to each unit area UA formed by partitioning the image area of the color image CP by the same sizes as that of the hatch pattern. The kind of the hatch pattern assigned to the unit area UA may be determined according to the pattern selection table PT. According to the pattern selection table PT shown in FIG. 28, the pattern kind corresponding to the RGB value of the color image, that is, the color value of (R, G, B)=(239, 0, 0) is the "grid", and the hatch pattern P1 (FIG. 30) of the grid line is applied to the color image CP. The hatch pattern P1 may be a vector image or a bitmap image.

In the pattern selection table PT shown in FIG. 28, the foreground concentration corresponding to (R, G, B)=(239, 0, 0) is K=232, and the background concentration is regulated as K=177. Accordingly, the pattern concentration determining unit 42 determines that the foreground concentration of the monochromatic image MP is K=232 and the background concentration is K=177.

The concentration changing unit 47 pays attention to each pixel of the monochromatic image MP. When the target pixel satisfies a predetermined condition, the concentration changing unit 47 performs a change process on the determined concentration. In the sixth embodiment, the change process may be any one of changing (the first process) the concentration value of the hatch pattern in the vicinity of the text image according to the distance from the text image or the concentration difference and changing (the second process) the concentration value of the text image. Any of such processes increases the concentration difference between the text image and the hatch pattern.

First, the first process will be described. When the text image is superposed on the hatch pattern, the concentration changing unit 47 changes the concentration of the hatch pattern according to the distance from the text image or the concentration difference. For example, as the distance between the hatch pattern and the text image becomes smaller, the concentration difference between the hatch pattern and the text image is increased. When the background concentration of the hatch pattern is higher (deeper) than the concentration of the text image, the concentration of the hatch pattern is made higher. When the background concentration of the hatch pattern is lower (fainter) than the concentration of the text image, the concentration of the hatch pattern is made lower.

In the sixth embodiment, on the basis of a predetermined distance in the horizontal direction and a predetermined distance in the vertical direction from the end portion of the text included in the text image, a rectangular are (the first area) regulated by the predetermined distances is assumed, the concentration value of the area S is uniformly changed. In this case, the concentration in the rectangular area S is low. The predetermined distance may be determined in advance by a unit of pixel, and may be set through a setting screen or the like of the printer driver 40 by the user. Around the text image, the size of such a rectangular area S is changed to be superposed by multi-stage. In this case, as the distance from the text image becomes closer, that is, as the rectangle becomes smaller, the concentration of the area S superposed on the front face becomes lower.

FIG. 29 shows that one rectangular area S is set. In this case, since the background concentration of the hatch pattern is lower than the concentration of the text image, the concentration of the hatch pattern in the rectangular area S becomes low.

Although not shown, the concentration in the rectangle may be continuously changed such as gradations. In this case, as it becomes closer to the text image, the concentration of the hatch pattern gradually becomes lower. In other words, as it gets farther away from the text image, the concentration of the adjacent hatch pattern gradually becomes higher. Accordingly, at the outer peripheral portion of the rectangle, the concentration becomes the same concentration as that of the hatch pattern, and it is difficult to distinguish the hatch pattern and the rectangle.

The area is not limited to the regulation of the rectangular shape, and the area may be regulated by a unit of pixel according to the line drawing curve of each text.

Next, the second process will be described. When the line drawing pixels of the text image is thicker than the peripheral pixels other than the text attribute, the concentration changing unit 47 makes the concentration of the line drawing pixels of the text image higher. When the line drawing pixels of the text image is fainter than the peripheral pixels other than the text attribute, the concentration changing unit 47 makes the concentration of the line drawing pixels of the text image lower.

For example, in a case of FIG. 29, in the color image CP, the text concentration is K=245, the peripheral background concentration is K=177, and thus the concentration changing unit 47 changes the text concentration to K=256 to further raise the text concentration.

As described above, the hatch pattern P1 of the grid line determined by the pattern selection table PT and the pattern image database PDB is applied to each unit area UA on the whole face of the color image CP, and the monochromatic image MP in which the hatch pattern P1 of the grid line is the graphic image is generated.

Figure 30:
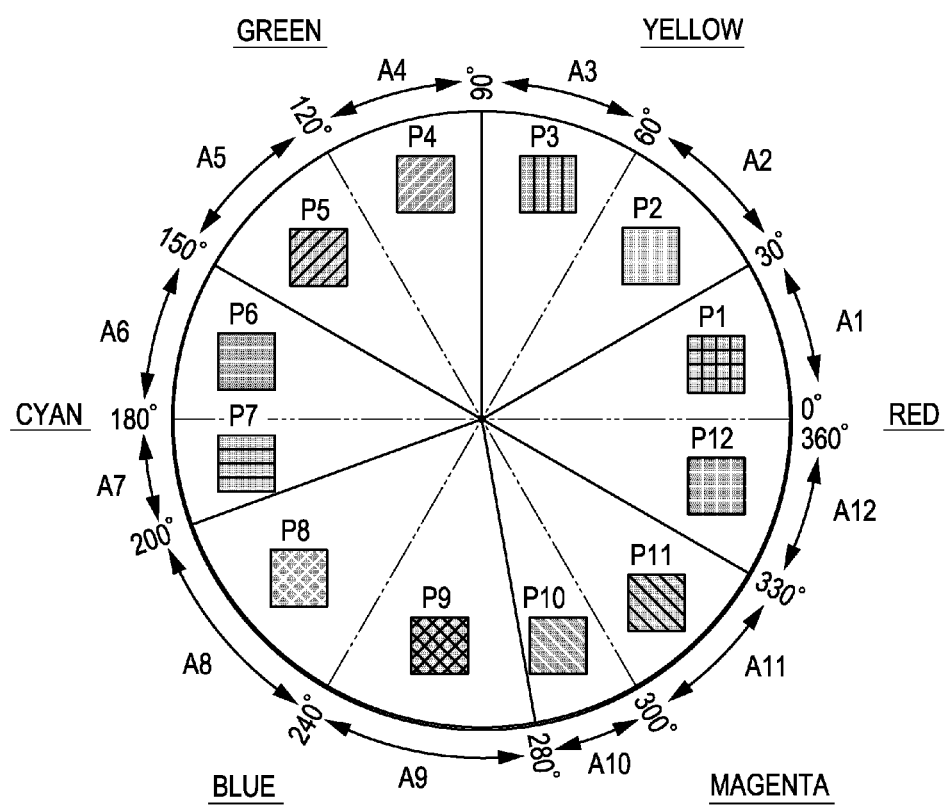
FIG. 30 is a diagram illustrating an example of correspondence between colors on a color circle and hatch patterns.

In the sixth embodiment, the reference of selecting the hatch pattern from the pattern selection table PT is preset to satisfy the following requirements according to the examples of the correspondence between the hatch patterns P1 to P12 on the color circle shown in FIG. 30 illustrating the example of the correspondence between the color tones and the hatch patterns on the color circle, but the invention is not limited thereto.

Figure 31:
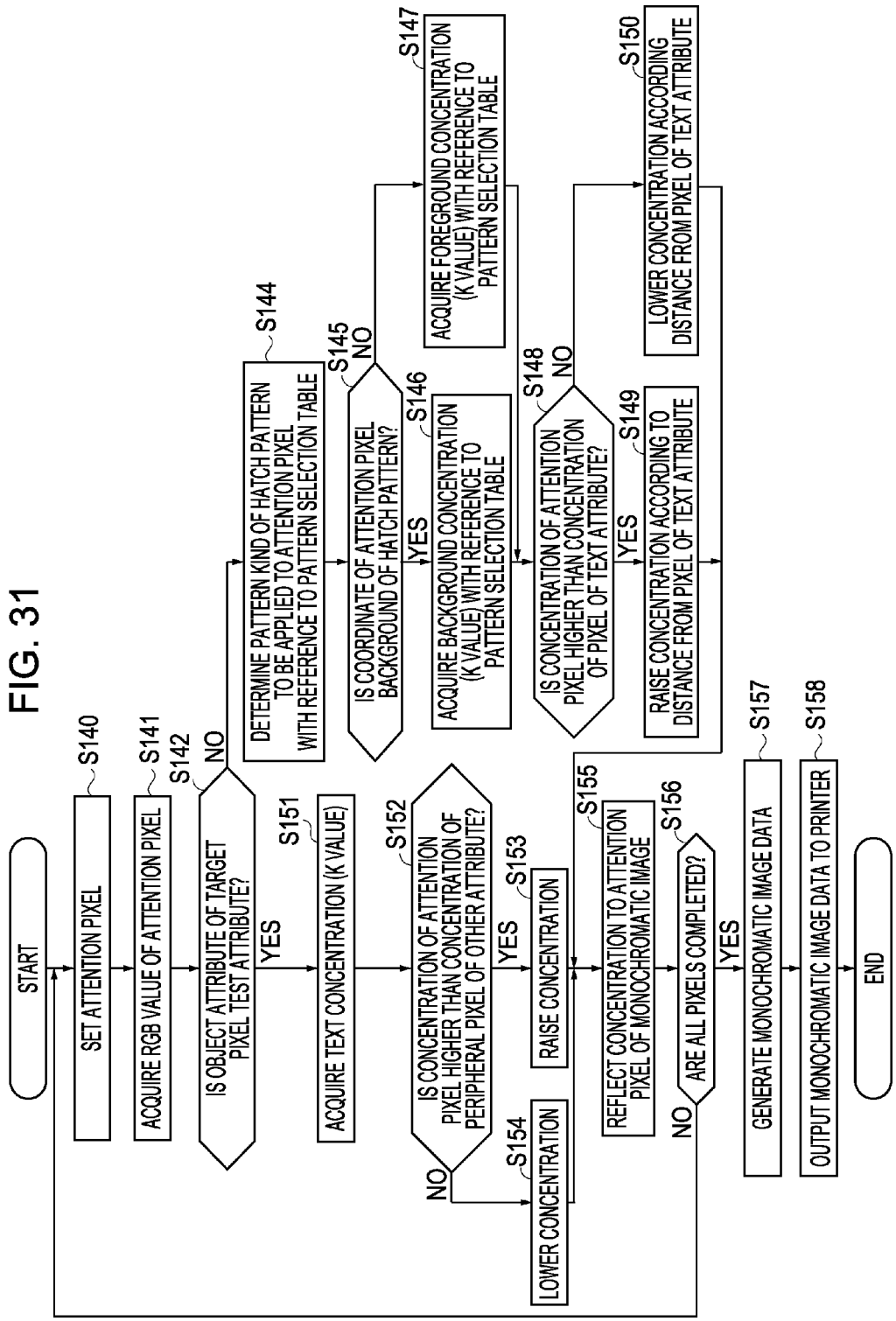
FIG. 31 is a flowchart illustrating flow of a process performed by an image processing device.

(1) Requirement for Assignment of Hatch Shape corresponding to Color Tone
(2) Requirement for Change of Background Concentration corresponding to Brightness of Color Value
(3) Requirement for Line Density of Hatch Shape corresponding to Brightness
(4) Requirement for Assignment of Hatch Shape between Colors in Complementary Relationship
(5) Requirement for Assignment of Hatch Shape between Colors of Color Areas adjacent to each other Next, a process performed by the image processing device 100 described above (an image processing method and an image processing program) will be described with reference to the flowchart of FIG. 31.

For example, when the printer driver 40 receives a printing instruction of monochromatic printing of the color image data from the application 30, a process shown in FIG. 31 is started. When the process is started, the pattern determining unit 41 sets a target pixel in the image area of the color image data (Step S140), acquires RGB value of the target pixel from the color image data (Step S141), and determines whether or not the object attribute of the target pixel is the text attribute (Step S142).

When the object attribute of the target pixel is the text attribute (Step S142: Yes), the pattern concentration determining unit 42 acquires the K value of the text concentration (Step S151).

Then, the concentration changing unit 47 determines whether or not the concentration of the target pixel is higher than the concentration of the peripheral pixels (Step S152).

When it is determined that the concentration of the target pixel is higher than the concentration of the peripheral pixels (Step S152: Yes), the concentration changing unit 47 raises the concentration of the target pixel by a predetermined amount (Step S153), and the process proceeds to Step S155.

Meanwhile, when it is determined that the concentration of the target pixel is lower than the concentration of the peripheral pixels of the other attribute (Step S152: No), the concentration changing unit 47 lowers the concentration of the target pixel by a predetermined amount (Step S154), and the process proceeds to Step S155.

Meanwhile, when it is determined that the object attribute of the target pixel is not the text attribute (Step S142: No), the pattern determining unit 41 determines the pattern kind corresponding to the acquired RGB value with reference to the pattern selection table PT (Step S144).

Then, the pattern concentration determining unit 42 determines whether or not the coordinate of the target pixel is the background position of the hatch pattern (Step S145).

As described above, the hatch pattern is assigned to the unit area UA with a predetermined size in the image area of the color image CP. Accordingly, herein, it is determined whether the target pixel is at the position corresponding to the background or is at the position corresponding to the foreground in the hatch pattern assigned to each unit area UA. Specifically, when the coordinate of the target pixel (a, b) is and the size of the hatch pattern is N×N pixels, the relative coordinate of the target pixel (x, y) is acquired by the following formulas (2) and (3). In the following formulas, "mod" is an operator of returning a remainder of division. The pattern concentration determining unit 42 determines whether the relative coordinate (x, y) corresponds to the background or the foreground in the hatch pattern with reference to the image data of the hatch pattern registered in the pattern image database PDB.

$$x = a \bmod N \quad (2)$$

$$y = b \bmod N \quad (3)$$

As a result of the determination, when the target pixel is the background of the hatch pattern (Step S145: Yes), the K value of the background concentration is acquired (Step S146), and the process proceeds to Step S148.

Meanwhile, when the target pixel is not the background of the hatch pattern (Step S145: No), the K value of the foreground concentration is acquired (Step S147), and the process proceeds to Step S148.

In Step S148, the concentration changing unit 47 determines whether or not the concentration of the target pixel is higher than the concentration of the text attribute. When it is determined that the concentration of the target pixel is higher than the concentration of the text attribute (Step S148: Yes), the concentration changing unit 47 raises the concentration according to the distance from the pixel of the text attribute (Step S149), and the process proceeds to Step S150. Meanwhile, when it is determined that the concentration of the target pixel is lower than the concentration of the text attribute (step S148: No), concentration changing unit 47 lowers the concentration according to the distance from the pixel of the text attribute (Step S150), and the process proceeds to Step S155.

In Step S155, each changed concentration value (K value) is applied to the pixel corresponding to the target pixel in the image area of the monochromatic image.

Then, it is determined whether or not the process of Step S140 to S155 is performed for all the pixels of the color image CP (Step S156). When the process is not completed for all the pixels (Step S156: No), the process returns to Step S140. For example, the pattern kind determining unit 41 scans the target pixel in a raster direction to set a new target pixel, and the process since Step S141 is performed on the new target pixel.

Meanwhile, when the process is completed for all the pixels (Step S156: Yes), all the pixels have the K value of the concentration corresponding to the hatch pattern of the determined kind, and the monochromatic image data generating unit 43 generates monochromatic image data of the monochromatic image (Step S157). The generated monochromatic image data is output as printing job data to the printer 20 by the printer driver 40 (Step S158). As a result, the printer 20 prints the hatched monochromatic image according to the printing job data transmitted from the application 30.

According to the sixth embodiment described above, there are the following advantages.

(1) When the monochromatic image data formed by transferring to the monochromatic hatch pattern corresponding to the color tone of the color image is generated from the color image data including the text data, the concentration of the hatch pattern in the periphery of the text image is changed on the basis of the concentration of the text image and the background concentration of the hatch pattern, and thus it is easy to read the text image. Accordingly, the person who sees the monochromatic image can clearly recognize the text image.

The first embodiment to the sixth embodiment according to the invention have been described above. However, the invention is not limited to the embodiments, and may be modified and improved without deviating from the concept thereof and Claims, and it is obvious that the invention includes equivalents thereof. Hereinafter, modification examples will be described.

Modification Example 1

In the embodiments, when the kind of the hatch pattern P applied to the color image is determined, the correlation between the color tone and the brightness of the color image is used, but the method of determining the kind of hatch pattern P is not limited thereto. The kind of the hatch pattern P may be determined according to the color tone, and the kind of the hatch pattern P may be determined according to the brightness.

Figure 10:
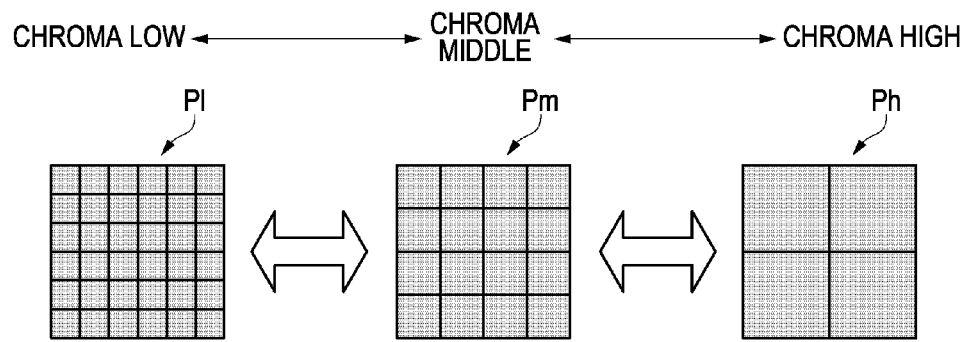
FIG. 10 is a diagram illustrating Modification Example 1.

The kind of the hatch pattern P may be determined according to the chroma. In this case, for example as shown in FIG. 10, the line density of the hatch shape may be changed according to the height and lowness of the chroma of the color image. That is, the hatch pattern Ph with the low line density of black is assigned to the high chroma, the hatch pattern Pm with the intermediate line density of black is assigned to the intermediate chroma, and the hatch pattern P1 with the high line density of black is assigned to the low chroma. Above all, when the foreground concentration of the hatch pattern P is lower than the background concentration, the line density may be made high as high as the height of the chroma. With such a configuration, the chroma of the color image is applied to the monochromatic image, and thus it is possible to print the monochromatic image from which the difference in chroma of the original color image is distinguishable.

Modification Example 2

In the embodiments, the process of converting the color image data into the hatching-applied monochromatic image data is performed according to the pattern selection table PT to satisfy Requirements (1) to (5), but the operation may be performed without using the table. That is, the brightness, the color tone, and the like corresponding to the RGB value of the color image data may be calculated by the operation, and the hatching satisfying Requirements (1) to (5) may be applied using the operation result. Above all, as compared with the case of acquiring the brightness, the color tone, and the like by the operation, the process may be performed at a higher speed when the pattern selection table PT is used.

Modification Example 3

In the embodiments, the data having the 8-bith gradation value for each color of RGB has been described as the color image data, and the data having the 8-bith gradation value for the K single color has been described as the monochromatic image data, but the color and the number of gradations regulated in the image data are not limited thereto. In the embodiments, the color image data of the bitmap form having the RGB value for each pixel of the plurality of pixels arranged in matrix has been described, but the color image data is not limited thereto. For example, the printer driver 40 receives color image data of an image form other than the bitmap, such as a vector form and develops the color image data into a bitmap by an internal process of the printer driver 40, and then the same process as that of the embodiment may be performed. The monochromatic image data is not limited to the image data of the K single color, and may represent an image of a single color other than the K.

Modification Example 4

Figure 11:
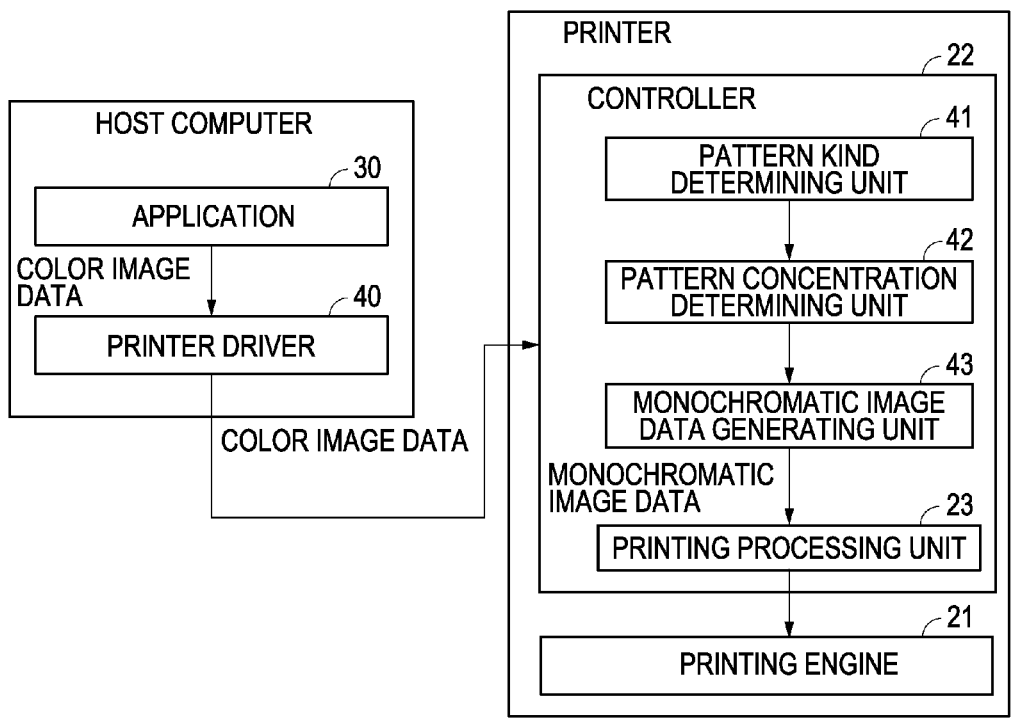
FIG. 11 is a diagram illustrating Modification Example 4.

In the embodiments, the color image data is converted into the hatching-applied monochromatic image data by the process of the host computer 10 side, but may be converted into the monochromatic image data by the internal process of the printer. As shown in FIG. 11, the controller 22 of the printer serves as the image processing device 100 including the pattern kind determining unit 41, the pattern concentration determining unit 42, the monochromatic image data generating unit 43, and the printing processing unit 23. The pattern kind determining unit 41, the pattern concentration determining unit 42, and the monochromatic image data generating unit 43 perform the same processes as those of the first embodiment on the color image data transmitted from the host computer 10. The printing processing unit 23 performs a halftone process and the like on the hatched monochromatic image data to cause the printing engine 21 to perform printing, and thus the monochromatic image from which the color difference in the original color image is distinguishable is printed.

The color image data may be converted into the hatched monochromatic image data in cooperation of the host computer 10 and the printer. In the system shown in FIG. 11, the printer driver 40 of the host computer 10 transmits the color image data, to which designation information designating parameters such as the pattern kind, the background concentration, and the foreground concentration is added, to the printer with reference to the pattern selection table PT. The pattern kind determining unit 41 of the printer may determine the pattern kind according to the designation information added to the color image data, and the pattern concentration determining unit 42 may determine the background concentration and the foreground concentration according to the designation information.

Modification Example 5

In the embodiments, the hatch shape is used as the monochromatic pattern applied to the color image, but the monochromatic pattern is not limited thereto. The monochromatic pattern having a predetermined regularity may be a shape other than the hatch shape.

The entire disclosure of Japanese Patent Application No. 2011-178274, filed Aug. 17, 2011, Japanese Patent Application No. 2011-218983, filed Oct. 3, 2011, Japanese Patent Application No. 2011-218984, filed Oct. 3, 2011, Japanese Patent Application No. 2011-218985 and filed Oct. 3, 2011 are expressly incorporated by reference herein.

What is claimed is:

1. An image processing device which converts color image data representing a color image into monochromatic image data, the image processing device comprising:
   a pattern determining unit that determines a monochromatic pattern representing a shape corresponding to a color of the color image by a monochromatic concentration;
   a pattern concentration determining unit that determines a background concentration of an area of a background of the shape in an image area of the monochromatic pattern; and
   a monochromatic image data generating unit that generates the monochromatic image data of the monochromatic image to which the monochromatic pattern having the background concentration is applied in the image area corresponding to the color image,
   wherein the pattern concentration determining unit changes the background concentration according to the color of the color image,
   wherein the pattern concentration determining unit changes the background concentration according to brightness of the color image, and
   wherein the pattern concentration determining unit determines the background concentration such that brightness of the monochromatic image is equal to the brightness of the color image.

2. The image processing device according to claim 1, wherein the pattern determining unit determines the monochromatic pattern representing a shape corresponding to the color of the color image of the color image data by the monochromatic concentration.

3. The image processing device according to claim 1, wherein the pattern determining unit changes a shape of the monochromatic pattern according to chroma of the color image.

4. The image processing device according to claim 1, further comprising correspondence information in which the color of the color image is associated in advance with the background concentration,
   wherein the pattern concentration determining unit determines the background concentration corresponding to the color of the color image with reference to the correspondence information.

5. An image processing device which converts color image data representing a color image into monochromatic image data, the image processing device comprising:
   a pattern determining unit that determines a monochromatic pattern representing a shape corresponding to a color of the color image by a monochromatic concentration;
   a pattern concentration determining unit that determines a background concentration of an area of a background of the shape in an image area of the monochromatic pattern; and
   a monochromatic image data generating unit that generates the monochromatic image data of the monochromatic image to which the monochromatic pattern having the background concentration is applied in the image area corresponding to the color image,
   wherein the pattern concentration determining unit changes the background concentration according to the color of the color image,
   wherein the pattern concentration determining unit changes the background concentration according to brightness of the color image, and
   wherein the pattern concentration determining unit determines the background concentration of the monochromatic pattern such that average brightness of the image area to which the monochromatic pattern is applied in the color image is equal to average brightness of the monochromatic pattern.

6. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image, wherein the monochromatic pattern is a hatch pattern representing a shape by monochromatic lines, and wherein the pattern determining unit determines the hatch pattern as the pattern applied to the color image, where the hatch pattern has higher line density as the brightness of the color of the color image becomes lower.

7. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image, and wherein the pattern concentration determining unit makes, among a first color and a second color adjacent to each other in a plurality of color areas formed by partitioning a color circle, the concentration of the shape of the monochromatic pattern corresponding to the first color higher than the background concentration, and makes the concentration of the shape of the monochromatic pattern corresponding to the second color lower than the background concentration.

8. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image, and wherein in the pattern determining unit, the monochromatic pattern corresponding to a fourth color in a complementary relationship with a third color represents a shape formed by rotating the shape of the monochromatic pattern corresponding to the third color.

9. An image processing device which converts color image data representing a color image into monochromatic image data, the image processing device comprising:

an image kind determining unit that determines a kind of the color image;

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image, and wherein the monochromatic image data generating unit converts the color image into a monochromatic image represented by a monochromatic concentration according to the determination result of the image kind determining unit.

10. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image;

a prohibiting image determining unit that determines whether or not the color image includes a predetermined prohibiting image so as not to apply the monochromatic pattern, wherein the pattern concentration determining unit changes the background concentration according to the color of the color image, and wherein the monochromatic image data generating unit converts the color image into a monochromatic image represented by a monochromatic concentration without applying the monochromatic pattern to the prohibiting image included in the color image.

11. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern; and a monochromatic image data generating unit that generates the monochromatic image data of the monochromatic image to which the monochromatic pattern having the background concentration is applied in the image area corresponding to the color image, wherein the pattern concentration determining unit changes the background concentration according to the color of the color image, and wherein the pattern concentration determining unit makes, a concentration of a boundary area that is a boundary between a background area of a monochromatic image and a pattern area as a foreground superposed on the background area in which a difference in concentration from the background area is larger than a predetermined value, lower than any concentration between the concentrations of the background area and the pattern area.

12. The image processing device according to claim 11, wherein the pattern concentration determining unit makes a higher concentration between the concentration of the background area and the concentration of the pattern area lower.

13. The image processing device according to claim 11, wherein the pattern concentration determining unit refers to a table in which at least one of the concentration of the background area, the concentration of the pattern area, and the concentration of the boundary area is regulated.

14. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern;

a monochromatic image data generating unit that generates the monochromatic image data of the monochromatic image to which the monochromatic pattern having the background concentration is applied in the image area corresponding to the color image;

a text vicinity determining unit that applies a first hatch pattern having a shape corresponding to a color of a graphic image including a text image to an image area excluding a first area within a predetermined distance from the text image, according to the color of the graphic image;

wherein the pattern concentration determining unit changes the background concentration according to the color of the color image, and.

15. The image processing device according to claim 14, wherein the text vicinity determining unit does not apply any hatch pattern to the first area.

16. An image processing device which converts color image data representing a color image into monochromatic image data, the image processing device comprising:

a pattern determining unit that determines a monochromatic pattern representing a shape corresponding to a color of the color image by a monochromatic concentration;

a pattern concentration determining unit that determines a background concentration of an area of a background of the shape in an image area of the monochromatic pattern;

a monochromatic image data generating unit that generates the monochromatic image data of the monochromatic image to which the monochromatic pattern having the background concentration is applied in the image area corresponding to the color image; and a concentration changing unit that applies a hatch pattern having a shape corresponding to a color of a graphic image including a text image to an image area corresponding to the color of the graphic image, and changes at least one of the concentrations of a first area of the hatch pattern far away from the text image at a predetermined distance and the text image, to make a concentration difference between the first area and the text image large, wherein the pattern concentration determining unit changes the background concentration according to the color of the color image.

17. The image processing device according to claim 16, wherein the concentration changing unit changes the concentration of the first area such that the concentration difference becomes larger as the distance between the hatch pattern and the text image becomes smaller in the first area.

18. An image processing method of converting color image data representing a color image into monochromatic image data, the image processing method comprising:

determining a monochromatic pattern representing a shape corresponding to a color of the color image by a monochromatic concentration;

determining a background concentration of an area of a background of the shape in an image area of the monochromatic pattern; and generating the monochromatic image data of the monochromatic image to which the monochromatic pattern having the background concentration is applied in the image area corresponding to the color image, wherein the background concentration is changed according to the color of the color image, wherein the background concentration is changed according to brightness of the color image, and wherein the background concentration is determined such that brightness of the monochromatic image is equal to the brightness of the color image.

* * * * *